(12) United States Patent
Nomura et al.

(10) Patent No.: US 6,222,150 B1
(45) Date of Patent: Apr. 24, 2001

(54) JOINED METAL MEMBER AND A METHOD AND AN APPARATUS FOR FABRICATING THE SAME

(75) Inventors: Seiji Nomura, Kure; Satoshi Nanba, Higashihiroshima; Yukio Yamamoto, Hiroshima; Yukihiro Sugimoto, Higashihiroshima; Shinya Shibata, Hiroshima, all of (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 09/153,455

(22) Filed: Sep. 15, 1998

(30) Foreign Application Priority Data

Sep. 16, 1997 (JP) ................................................ 9-270663

(51) Int. Cl.⁷ ............................ B23K 20/00; B23K 11/00
(52) U.S. Cl. ........................................ 219/78.02; 228/194
(58) Field of Search ........................ 219/78.02; 228/194; 29/498

(56) References Cited

U.S. PATENT DOCUMENTS

| | | | |
|---|---|---|---|
| 3,644,698 | * 2/1972 | Metcalfe et al. | 219/78.02 |
| 3,667,110 | * 6/1972 | Gwyn, Jr. | 29/494 |
| 3,675,311 | * 7/1972 | Wells . | |

(List continued on next page.)

FOREIGN PATENT DOCUMENTS

| | | | |
|---|---|---|---|
| 0 028 763 | 5/1981 | (EP) . | |
| 0 389 625 | 10/1990 | (EP) . | |
| 548350 | * 3/1941 | (GB) | 219/78.02 |
| 705748 | * 2/1952 | (GB) | 219/78.02 |
| 58-13481 | 1/1983 | (JP) . | |
| 62-199260 | 9/1987 | (JP) . | |
| 6-58116 | 3/1994 | (JP) . | |
| 8-100701 | 4/1996 | (JP) . | |
| 8-200148 | 8/1996 | (JP) . | |
| 8-270499 | 10/1996 | (JP) . | |

OTHER PUBLICATIONS

Fusion Welding Classification Chart, Welding Journal,Published Apr. 1976—Classification of The Welding processes by the American Welding Societies Subcommittee on Definitions—pp. 270–272.*

DOC–US Govt Research Report–PB 151089–DMIC Report 131 Jun. 24, 1960, Office of the Director of Defense Research and Engineering–Fusion–Welding processes and High–Temperature Brazing pp. 26–28.*

*Primary Examiner*—Patrick Ryan
*Assistant Examiner*—Anjan Dey
(74) *Attorney, Agent, or Firm*—Nixon Peabody LLP; Donald R. Studebaker

(57) ABSTRACT

The present invention provides a method for joining two metal members into a joined metal member. The method comprise steps of; applying a brazing material having a higher melting point than both the members on the surface of a first metal member and heating them to form a brazing material on said surface and a braze-diffusion layer under the brazing material in the surface area of the first member; and, then, pressing the first and another second metal members between which the brazing material is interposed during heating at a higher temperature than said melting point of the brazing material to squeeze the molten brazing material out between both the contact surfaces of both the metal members, therefor the two metal members being joined by the braze diffusion layers formed in both the surfaces into the joined metal member. Particularly, the first metal member may comprise an iron-based alloy and the second metal members may comprise an aluminum-based alloy, and the brazing material may be zinc-containing material such as Zn—Al eutectic alloy.

20 Claims, 33 Drawing Sheets

U.S. PATENT DOCUMENTS

| | | | |
|---|---|---|---|
| 3,708,866 | * 1/1973 | Wells | 29/498 |
| 3,851,138 | * 11/1974 | Metcalfe et al. | 219/83 |
| 3,985,283 | * 10/1976 | Gempler | 228/194 |
| 4,034,906 | 7/1977 | Carlson et al. | 228/194 |
| 4,046,305 | * 9/1977 | Brown et al. | 228/194 |
| 4,331,286 | * 5/1982 | Miyazaki et al. | 228/194 |
| 4,690,320 | 9/1987 | Morishitia et al. | 228/194 |
| 4,829,152 | * 5/1989 | Rostoker et al. | 219/78.02 |
| 4,918,281 | * 4/1990 | Blair | 219/78.02 |

\* cited by examiner

Pressure + Current

JOINED METAL MEMBER AND A METHOD AND AN APPARATUS FOR FABRICATING THE SAME

BACKGROUND OF THE INVENTION

1. Field of the Invention

The present invention relates to a joined metal member which are joined of two metal members by liquid diffusion joining and to a method and an apparatus for fabricating the same.

2. Prior Art

There is known thermal insert technique as a conventional method for joining two metal members, which has been applied for joining, for example, valve sheets in the rim around the opening of the inlet or outlet boats shaped in the cylinder head in the field of a engine.

A proposal which is made in Japanese Patent Application JP-A 8-100701, is to braze the valve sheet to the aluminum based cylinder head body by using an Al—Zn based brazing material and a fluoride-containing flux.

Another proposal is put forward to join the two metal members by resistance welding using contact resistance heating due to contact between them, as described in Japanese Patent publication JP-A 58-13481. In this electric resistance welding an increase in calorific value on the joining surfaces between the two members has been accomplished by forming the valve sheet of a sintered material and impregnating a metal in the pores of the sheet, therefor reducing the heating value inside the body of the sheet (see Japanese Patent publication JP-A 6-58116).

Also, Another proposal has been made to form a metal film on the surface of the valve sheet and melt the film while fitting to the cylinder head body by heating (see Japanese Patent Publication JP-A 8-270499).

Further, another proposal is made, for example, as described in Japanese Patent Publication JP-A 8-200148, to join the valve sheet and cylinder head body by utilizing solid diffusion joining (e.g., pressure welding) while forming the layer plastically deformed, without forming any molten reaction layer, on the surfaces to be joined on the side of the body. Namely, this solid diffusion joining method forms a eutectic alloy by reaction between a copper coat on the valve sheet and the material of the cylinder head body, allowing the eutectic alloy to change in a liquid layer to be squeezed out of the joining surfaces.

Furthermore, as described in Japanese Patent Publication JP-A 62-199260, a method is proposed in which an alloyed layer is formed by reacting two mother materials and a brazing material which is interposed between them by heating and the rest of the non-reacting brazing material is removed from the joining surfaces thereof by pressing.

However, in the conventional methods as described above, in the thermally inserting method, both the members requires a large mass enough to prevent one member to be inserted from separating from the other and to bear the constrictive forces applied between them when they are inserted. Therefor, in the case of the cylinder head, the valve sheet is needed to increases in thickness and width, whereas it has been limited to extend the intervals of the boats and enlarge the throat diameters. Furthermore, since this method results in an insulating aerial layer interposed between the valve sheet and the cylinder head body, it is impossible to efficiently reduce the temperature in regions near the valve sheet due to lowering thermal conductivity in the regions.

The methods of joining both the members by simply brazing or resistance welding can maintain high thermal conductivity but are difficult to apply in conjunction of the valve sheet and cylinder head because of their lower joining strength. Particularly, the joining method using brazing requires the heating of the metal members in a furnace for a long period of time, which is impossible to satisfy request for the inline production. In this method the aluminum based metal member which has been previously thermally treated can often lose the thermal treatment effect during a soldering process.

On the other hand, the solid diffusion joining method above has advantages of providing much more compact valve sheets than the joining method of thermal inserting and of enabling a wide range of diversiform designs of the members. Particularly, in combination of aluminum based cylinder with the iron based valve sheets it is necessary to use the opposite procedures to suppress generation of the brittle intermetalic compounds and in the same time to diffuse iron and aluminum atoms, so that it is difficult to set the appropriate condition for joining the members and limited to improve joining strength.

In the method of removing the molten non-reacted brazing material out of the joining surfaces, after forming the alloyed layer, as mentioned above, it is possible to increase the joining strength at said surfaces because of forming each alloyed layer on each joining layer. If the brazing material has a composition far beyond the eutectic composition, in a earlier stage of pressurizing, only low melting point part (eutectic part) of the braze flow out, the high melting point part thereof left so that high thermal value is required to be supplied to perfectly melt the braze down. In this case, it takes so long to join the mother materials that the mother materials are softened in the joining surfaces, lowering the effect of destroying the oxide film on the surfaces even if they are pressed at high pressure, resulting in decreasing the effect of removal the braze out of the surface.

SUMMARY OF THE INVENTION

An object of the present invention is to provide a method for joining two metal members to produce a joined member for the short period of time which has higher joining strength than the conventional members without strictly controlling the joining conditions.

Another object of the invention is to provide an apparatus of fabricating a joined metal member by joining two metal members using liquid diffusion joining.

Another object of the invention is to provide joined member comprise the two metal members which has higher joining strength than the conventional members.

The present invention provides a method of joining a first and second metal members by liquid diffusion joining through diffusion layers each formed in a joining surface of each metal member, wherein the diffusion layer of the first member is formed between the first metal member and a brazing material applied thereon having a lower melting point than both the members and a eutectic or the vicinity composition, and the diffusion layer of the second metal member is formed between the second metal member and said molten brazing material which is diffused thereto so as to increase the melting point due to concentrating the second metal material components in the brazing material In the method for joining two metal members in the invention, in a first step, a first metal member is formed with a brazing material on the surface to be joined and its diffusion layer in the surface under the brazing material.

In a second step, the second metal member faced to is the metal first member in contact with each other through the brazing material, and both the metal members then are heated in a higher temperature with the brazing material melted to form the diffusion layer and then are pressed to force the part of the brazing material to be squeezed off the joining surfaces, thereby, being joined by the two diffusion layers formed under the surfaces of both the members.

Since the brazing material is selected to have a lower melting point than both the members and also a eutectic or the vicinity composition, in the second step, while pressing the two members and heating at a higher temperature than the melting point, the brazing material between the members is diffused into the surface of the second metal member to form the diffusion layer, and during diffusion the brazing material increases in melting point due to concentrating the second metal member components to solidify on the surface, whereas the molten non-reacting braze material is squeezed off by pressing.

In this step, during heating, the brazing material which is in almost eutectic composition on the first metal member can be melted down at the lowest temperature with a minimum input of heat supplied, lowering the time required for joining. Further, this method prevents the second metal member from being softened and enables a high pressure to be applied to the first metal member in order to destroy the metal oxide layers present on its surface, which can be removed out of the surfaces together with the rest molten brazing material squeezed off. Accordingly, this ensures both the diffusion layers to be joined without presence of any foreign inclusions and the joint strength of the joined material to be enhanced. Unlike use of eutectic reaction during joining in the above-mentioned solid diffusion method, this method of the present invention can obtain joint stability between the metal members even by supplying such low input power in the short supplying time and may set the pressure and supplying heat power so as to melt the brazing material and squeeze it off, resulting in extending the range of the conditions to obtain high joining strength.

The method of the present invention makes much use of liquid diffusion reaction of the brazing materials, causing the members to be joined effectively for short period of time of thermal pressing into a joined metal member. Further, the joined member can be attained to exhibit joint strength which is determined by the diffusion layers and which is due to much thinner brazing residual layer in the conjunction clearance.

Particularly, a method of the present invention for joining two metal members into a joined member, comprises steps of; applying a brazing material having a lower melting point than both the members on a joining surface of a first metal member and heating them to form a brazing material on said surface and a braze-diffusion layer under the brazing material in the surface area of the first member; and, pressing the first and another second metal members with the brazing material interposed between them during heating them at a higher temperature than said melting point of the brazing material, enforcing part of the molten brazing material to be squeezed out of the clearance of the surfaces, therefor joining the two metal members by the braze-diffusion layers in both the surfaces.

Also, the present invention includes a joined metal member comprising two metal members which are joined by liquid diffusion joining with diffusion layers formed by diffusion of a brazing material into each joining surface, wherein the diffusion layer of the first metal member is formed of a brazing material of the brazing material applied and heated on the surface, and the diffusion layer of the second metal member is formed by diffusion of said brazing material on the surface of the first metal member in contact with each other while the two metal members are heated and pressed.

In the present invention, preferably, the first metal member may comprise an iron based material and the second metal members may comprise an aluminum based material.

The brazing material is selected from a metal material having a lower meting point than said two metal members in a composition of a eutectic or its vicinity. particularly, the brazing material is desirable to be zinc based material with respect to a combination of both the iron based alloy and the aluminum based alloy.

The brazing material, mainly containing Zinc, easily can react to the iron based material of the first metal member to form Fe—Zn based diffusion layer thereon, and also react to the aluminum based material of the second member to form Al—Zn based diffusion layer thereon, then, both diffusion layers being joined directly, without formation of the brittle Fe—Al intermetalic compounds in the joined interface of the two metal members.

Particularly, as a brazing material Zn—Al based alloy, containing 92–98% by weight of Zn may be used.

The material of such a composition has so low a melting point of about 400° C. or less as to easily melt in a short joining time, therefor, assuredly preventing the first metal member of the iron based material from deforming in heating and pressing, and also, the second metal member from softening and melting.

Particularly, the brazing material may contain about 95% of Zn and 5% of Al, which is in a composition forming a Zn—Al eutectic. such a brazing material is in the lowest melting point Zn—Al alloy, which is most suitable for joining said iron based and aluminum based metal members.

In use of such a brazing material, the major component Zn can be easily diffused into the joining surfaces of the both metal members to form diffused layers so that the brazing material is lowered in Zn concentration to increase in melting point. The two diffused layer in both the iron based alloy and the aluminum based alloy is higher in the meting point than the original brazing material. As a result, The joined metal member which is joined of the iron based alloy and the aluminum based alloy can easily obtained by using the easy-handling brazing material and much higher heat resistance of the joined member than expected from the easy melting brazing material can be achieved.

In the joined member and the method, the first metal members may be a sintered compact, which may easily produced in a desired form. Particularly, the first metal members may be a forged-sintered compact. This member is formed by forge the sintered material from a compact of powder, to press off the pores residual in the sintered body to densify it in advance. In pressing to join the two members, the pressure applied effectively acts on squeezing the brazing material from between the joining surfaces, without being consumed to press the pores, then enhancing the joint strength between the two metal members.

Further, In the present invention, the first metal member may be impregnated with a high thermal conductive material into the porous sintered material. This impregnated material is densified by filling the pores residual in the sintered body with the conductive material, resulting in the same effect.

Preferably, the high thermal conductive material may be a copper based material. in the step of forming a brazing material and the diffusion layer, the brazing material and the diffusion layer of the first metal member is preferably formed at a total thickness of 10 µm or less, to prevent the brazing material from diffusing on the first metal member at more diffusion thickness than necessary and the composition of the brazing material from greatly deviating outside the eutectic due to concentrating the component from the first metal member in the diffusion layer. As a result, the brazing material can be maintained to be near the eutectic composition, obtaining the effects of destroying the oxide films on the first member and of flowing the molten brazing material out, and then to ensure improving strength of the joined layers.

In the method of the invention, the step of applying the brazing material on the surface, may include soaking the first member into a bath of the brazing alloy and ultrasonically vibrating the surface thereof therein, then forming said brazing coating and diffusion layer in the area of the surface of the first member. Use of the ultrasonic vibration may easily form the diffusion layer on the metal member facilitate controlling the layer thickness of 1 µm or less for a very short time of soaking, compared with the conventional melting plating technique of merely soaking in the bath. Also, this method dose not require any other process, for example, for removing the flux from the coated member in the usual brazing method using the flux.

Further, in the method of the present invention, in the step of pressing during heating, it is preferable that the two metal members is heated at the temperature by supplying electric current across both the metal members. The current may be supplied to the first metal member, for example, by butting an end side of an electrode to said member, at the same time that the electrode is pressing at some pressure the first metal member. The current is supplied through the joining surfaces with the brazing material, the surfaces can be very simply heated at the desired melting temperature of the braze and then joined for a short period of time.

In the method of the present invention, the step of pressing the first and second metal members may include plastically deforming the joining surface of the second metal member. Thereby, oxide films and other stain components are effectively removed from the surface of said second metal member which is joined with other surface of the first member with high cleanness of the micro structure obtained in the joined interface.

In the diffusion layers thus formed in the joined interface an alloyed layer is preferably precipitated, or interposed between the two diffusion layers, this alloyed layer strengthening the bond between said two layers to enhance further joining strength of the joined metal member.

The present invention includes an apparatus for joining a first and a second metal members into a joined metal member, comprising; a brazing device of forming a braze layer on the surface of the first metal member and a diffusion layer thereunder into the said surface by diffusing the brazing material, having a lower melting point than both the members and being easily able to produce a eutectic or the vicinity composition with reaction to the second metal member, on the surface of a first metal member; and, a joining device comprising a pressing device for pressing the first and the second metal members between which the brazing material is interposed and a heating device for heating them at a higher temperature than said melting point of the brazing material, to form a diffusion layer on the second metal member surface with the brazing material which increases in its melting point due to concentration of the second metal member component in the brazing material, and then to squeeze the rest of the molten brazing material out of the contact surfaces of both the metal members, thereby the joined metal member being obtained from the two metal members by liquid diffusion joining of both the diffusion layers each other which are formed in both the surfaces. The heating device may comprise an electric heat controller to supply electric current across both the metal members, heating the two metal members with said surfaces facing in contact at said temperature.

Particularly, the heating device may comprise a power supply and one or more electrodes which abut the first metal member to the second metal member and supply the two metal members to heat the two joining surfaces in contact with each other by Joule resistance heat. The electrodes of the heating device may be used as the press rods to press the first metal member to the second metal member of the pressing device to pressurize the joining surfaces during a heating process.

In the apparatus, preferably the electric heat controller may generates pulse currents for supplying the pulse currents with higher and lower currents repeated.

The present invention is applicable to an engine members comprising some small portions to be attached to a large body. For example, the joined metal member may a cylinder head of a engine, the second metal member may be a body of the cylinder head, the body being provided with boat openings, and the first member is a valve sheet which is joined to each inner rim of the boat openings in the body.

An advantage of application of the invention to such engine cylinder head blocks are that the valve sheet as a first metal member may be made more compact, compared with other joining method such as thermal inserting technique, so as to decrease the intervals between the boats and also increase the throat diameters of the openings.

Another advantage of the application is that it is possible to enhance the thermal conductivity at a vicinity of the valves on the cylinder head without any insulating layer occurring across the joining surfaces and to allow the cooling water passage buried in the block to approach the valves sheets, therefor cooling the head body at the vicinity of the valve sheets at low temperature at may be decreased. Thus, the present invention can greatly improve the performance and responsibility of the engines.

BRIEF DESCRIPTION OF THE DRAWINGS

The present invention is described in more detail below, with reference to the accompanying drawings, in which.

DETAILED DESCRIPTION OF THE PREFERRED EMBODIMENTS

Embodiment 1

Figure 1:
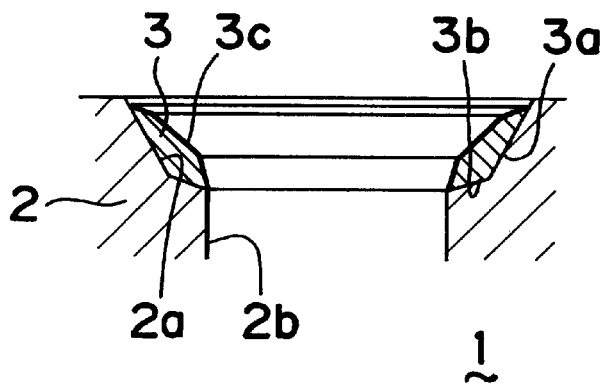
FIG. 1 is a sectional view showing a joined portion of cylinder head as a joined metal member for a engine according to an embodiment of the present invention.

FIG. 1 shows part of a cylinder head 1 of a engine as a joined metal member. This cylinder head part 1 includes an openings of any one of four boats 2b, . . . for exhaust and suction in the cylinder head and a valve sheet 3 in a ring form which is located around the rim, which is butted by a valve, of the opening. The rims of the boat openings are arranged at four corners of a square as shown from the bottom of the cylinder head and each rim is made to be a joining surface 2a with respect to the valve sheet.

The valve sheet has a valve butting surface 3c in the inner face, which is formed in a tapered shape with a diameter decreased along its upper side, to be accept the valve. each peripheral face of the valve sheet 3 is a first joining surface 3a relative to the cylinder head body 2, is surrounded by the joining surface 2a of the cylinder head body 2 and is tapered in the same manner. The upper face of the valve sheet is a second joining surface relative to the cylinder head body, inclined upward to the inner direction.

Figure 2:
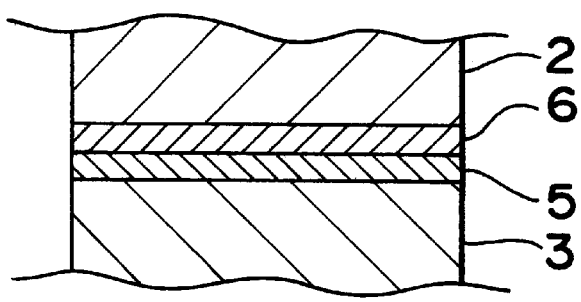
FIG. 2 is a schematic sectional view of a valve sheet and a cylinder head body joined according to an embodiment.

The valve sheet 3 is formed of the iron-based sintered compact in which Cu-based material is impregnated. As schematically shown in FIG. 2, the first and second surfaces 3a, 3b of the valve sheet contact with the cylinder head body are formed with a brazing material containing a Zn—Al eutectic alloy material (a eutectic composition of containing 95 wt % of Zn and 5% wt % of Al (which is almost the same as the composition of the cylinder head body, as will be described below)) on the surface and an iron-side liquid reaction layer 5, i.e., a diffusion layer, which is formed by reaction due to diffusion of the braze components toward the sintered surface of the valve sheet. This diffusion layer 5 contains Fe—Zn components, since Zn component, which is present in the molten braze, diffuses into the iron-based sintered valve sheet 3 passing through the surface during heating.

On the other hand, the cylinder head body 2 comprises an Al-based material which is formed with another diffusion layer 6, i.e., an aluminum-side liquid reaction layer, on the joining surface due to liquid diffusion of said brazing material applied on the valve sheet thereto. Namely, this diffusion layer 6, or aluminum-side liquid reaction layer, is a Al—Zn layer which causes Zn component present in the braze layer to diffuse in liquid to the side of the cylinder head body 2.

It should be noted that the brazing material has lower melting point than the materials composing the valve sheet 3 and cylinder head body 2.

The valve sheet and the cylinder head body are joined through the two diffusion layers 5 and 6, i.e., the iron-side reaction layer 5 and the aluminum side reaction layer 6 in a liquid diffused state, as shown in FIG. 2. The thickness of the iron-side reaction 5 preferably is restricted to be 1.0 $\mu$m or less and the total thickness of the iron-side liquid reaction layers 5 plus the aluminum-side 6 is preferably in a range of 0.3 to 1.0 $\mu$m. Alloyed parts may be formed in the two diffusion layers, which results from reaction of the two diffusion layers each other. The alloyed parts have a composition in a range of 5–10% of Al and about 10% of Zn and the balance Fe by weight. The compositions of the iron side liquid reaction layer, the alloyed layer and the aluminum diffusion layer change in composition gradually.

A method of fabricating the cylinder head by joining the valve sheets with the opening rim on the cylinder head is explained below.

Figure 3:
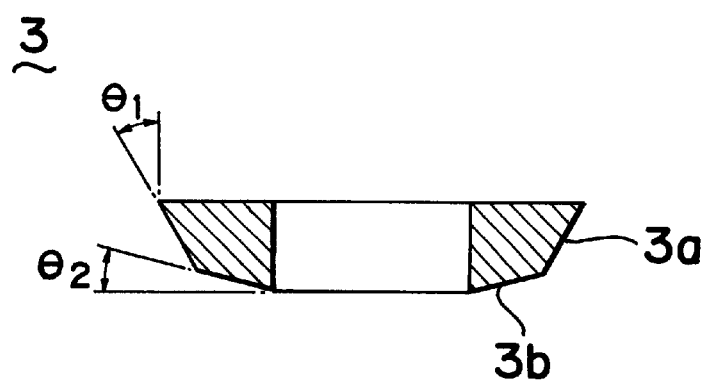
FIG. 3 shows a sectional view of a valve sheet before joining.

First, a valve sheet 3 is made by sintering a powdered iron-based material. The valve sheet 3 is formed with the upper side and the inner side to be thick enough to bear a high pressure applied at the time joining to the cylinder head body 2. In this step of forming the valve, the sheet has a inner peripheral face straitened upwards and a upper surface flattened without forming the butting surface 3c above. Also, in the sheet, the first joining surface 3a to the cylinder head body is formed at a taper angle $\theta_1$ of about 0.52 rad (30°) as shown in FIG. 3, and the second joining surface 3b formed at an inclining angle $\theta_2$ of about 0.25 rad (15°), in FIG. 3. A decrease in the taper angle $\theta_1$ results in low effect of destroying the oxide film present on the surface during joining, though it is easy to embed the sheet 3 into the opening of the cylinder head body 2. On the contrast, an increase in the angle $\theta_1$ makes the embedding of the valve sheet difficult, and then a large outer diameter of the sheet makes the narrowing of the intervals between the adjacent boats 2b, 2a impossible. Therefor, in this embodiment, the taper angle $\theta_1$ may be determined to be about 0.52 rad (30°).

Next, a copper ring is formed to have almost the same diameter as the valve sheet has, by sintering the powdered copper based material, and then the copper ring placed on the sheet is heated in a furnace to melt thereon, thereby obtaining a copper-impregnated sintered valve sheet. Thereafter, the valve sheet is covered with a plated thin film of copper (thickness of 2 $\mu$m on the first and second joining surfaces 3a, 3b in order to prevent the oxide film from forming on the surface.

Figure 5A:
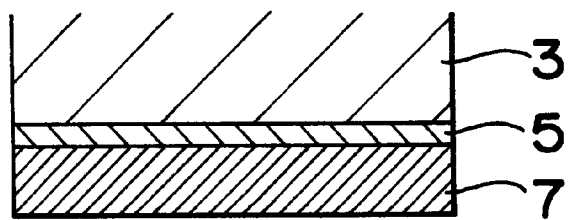
FIGS. 5A–5C are schematically sectional views showing a process of joining the two metal members such as a valve sheet and a cylinder head body according to an embodiment of the present invention.
Figure 5A:
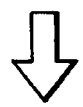
Figure 6:
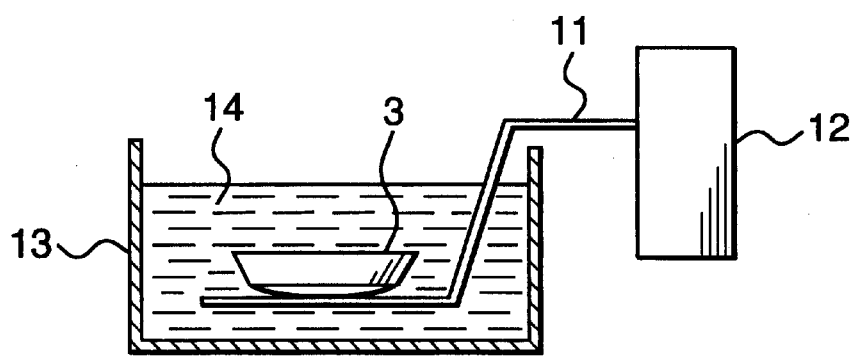
FIG. 6 shows a device of coating a valve sheet with a brazing material, which is soaked in a braze melt bath by using ultrasonic vibration.

Further next, as shown in FIG. 5A, a brazing material layer 7 is previously applied on the first and second joining surfaces 3a, 3b of the valve sheet 3 by using a brazing device, in order to form a iron side liquid reaction layer 5 due to reaction of the brazing material to the valve sheet during heating. At this time, the thickness of the iron-side liquid reaction layer 5 is controlled to be 1 $\mu$m or less. To form the brazing material layer 7 and the diffusion layer 5, preferably, the valve sheet is soaked in a brazing bath as a brazing device, supplying ultrasonic vibration to the surfaces thereof. As a result the valve sheet is coated with the very thin braze layer. This technique is hereinafter referred to as ultrasonic plating. In this technique, as shown in FIG. 6, in the bath, the valve sheet is vibrated ultrasonically, which is placed on a vibrating plate connected with a ultrasonic vibrator which makes up the brazing device, so that the sheet is made clean by removing said copper plated layer, the oxide layers and other stain components on the surface due to cavitation reaction of the ultrasonic waves and then is formed with the iron-side liquid reaction layer 5 containing components Fe and Zn by diffusion of a braze composition under the clean surface and with a brazing material 7 on the diffusion layer after pulling up the sheet from the bath. This method can be made more easy and certain to produce the diffusion layer on the surface than the conventional method of utilizing a mechanical friction (friction soldering) technique such as rubbing a brazing material to the valve sheet.

A plating condition may be selected, for example, to be in a bath temperature of 400° C. and a treating time of 20 sec of ultrasonic treatment in the case of ultrasonic power supply of 200W.

The resulting valve sheets 3 are attached to the opening rims of the boats 2b, which have joining surfaces 2a, with which the cylinder head body 2 has previously been formed by casting process, while the joining surfaces 2a have a taper angle of 45°, differently from the first and second joining surfaces' taper angles of the valve sheet.

Figure 7:
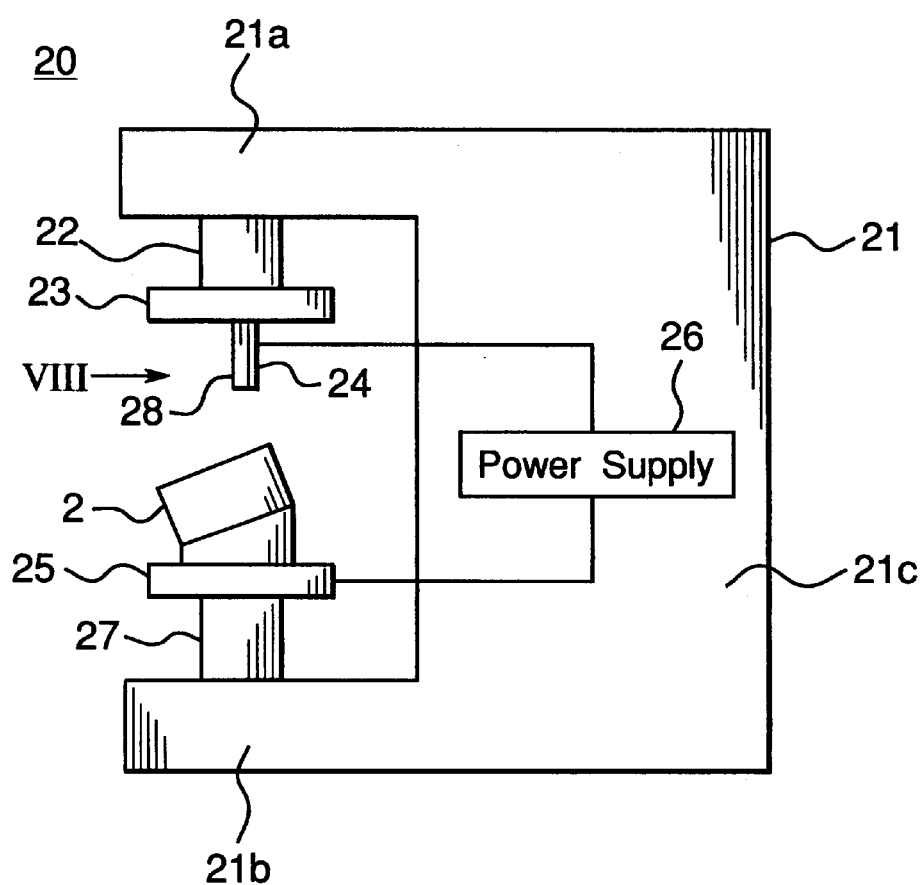
FIG. 7 shows a side view of a joining device for joining a sheet to a cylinder head body according to an embodiment of the present invention.

In joining, each valve sheet is pressed into the corresponding opening and heated simultaneously by using a joining device 20 such as an improved projection welding machine which is commercially available. For example, as shown in FIG. 7, the joining device 20 comprises a pressing device, which is provided with a yoke-like supporting body 21, having a lower and a upper lateral projection parts 21a, 21b, a pressing cylinder 22 longitudinal under the upper projection part 21a, and a movable stage 27 on the lower projection part 21b. Under the pressing cylinder 22, an upper electrode 24 is projected downward from the cylinder rods, and a lower electrode 25, which faces toward the upper electrode 24, is arranged on the movable stage 27, on which a cylinder head body 2 can is placed with its openings facing to the upper electrode.

The heating device comprise said electrodes 24 and 25, the electric supply 26 which are connected to the electrodes and a electric heat controller to regulate the current. In joining, the upper electrode 24 is positioned to one of the valve sheets 3 on the corresponding opening rims of the body 2 placed on the lower electrode, so as to heat the valve sheet and the rim in contact with each other.

Figure 8A:
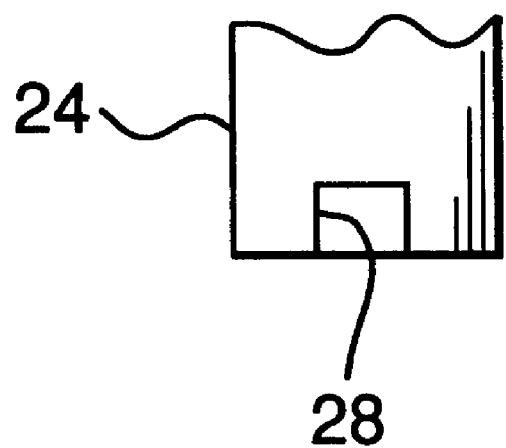
FIG. 8A shows an upper electrode of the joining device, showing along the arrow VIII in FIG. 7.
Figure 8B:
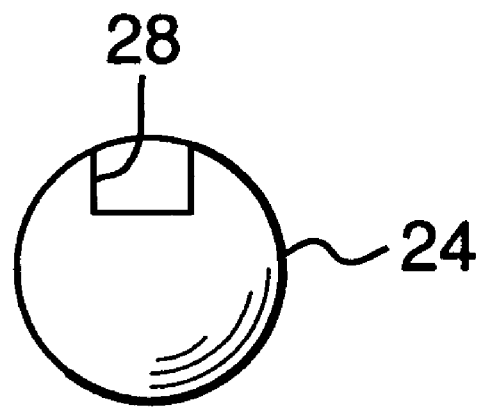
FIG. 8B shows a bottom view of the upper electrode used in the joining device shown in FIG. 7.
Figure 9:
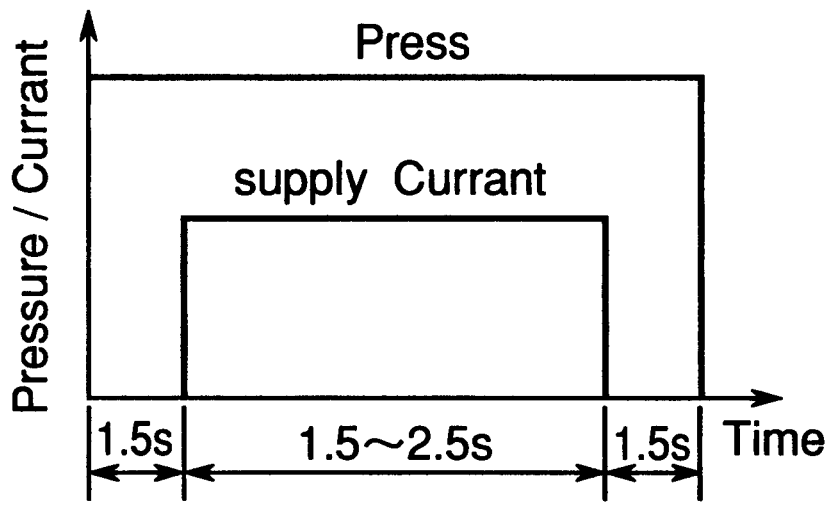
FIG. 9 is a timing chart in a process for controlling a current and a pressure supplied for joining according to a embodiment.

In this case, a cavity 28, notch or reentrant, as shown in FIGS. 8A and 8B, may be preferably shaped on the end side of the upper electrode 24, which side butts on the sheet, to make a insulating portion thereon.

Figure 4A:
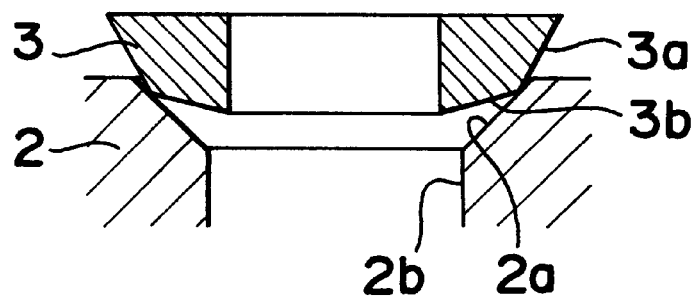
FIGS. 4A–4C are sectional views showing a process for joining a valve sheet to a cylinder head body according to an embodiment of the present invention.
Figure 4A:

In the joining process, the valve sheet 3 are placed inside the opening rims and pressed by the upper electrode 24 through the pressing cylinder system, while at this time only the corner or edge between the first and second joining surfaces 3a, 3b comes into contact with the rim, i.e., the joining surface 2a of the cylinder head body 2, as shown in FIG. 4A.

Next, the upper electrode 24 is pushed toward the valve sheet through the pressing cylinder system, preferably at a pressure of 29420 N (3000 kgf).Then remaining the pressurizing, the two electrodes supply a current across the valve sheet and the cylinder head body, to heat the joining surfaces thereof at a temperature over the meting point of the brazing material, thereby melting the brazing material on the valve sheet. The current may be selected to be about 70 kA, for example.

Figure 4B:
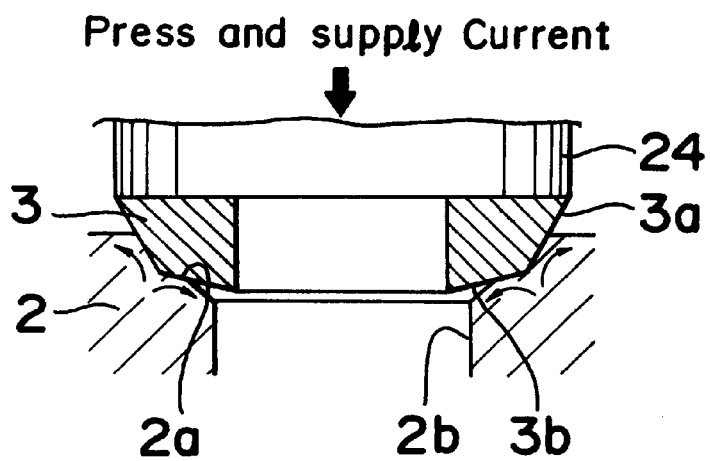
Figure 4B:
Figure 4C:
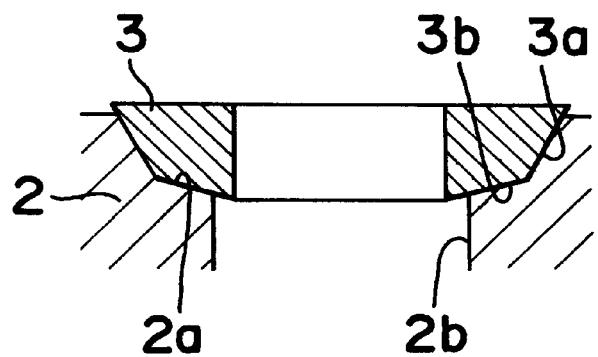
Figure 5B:
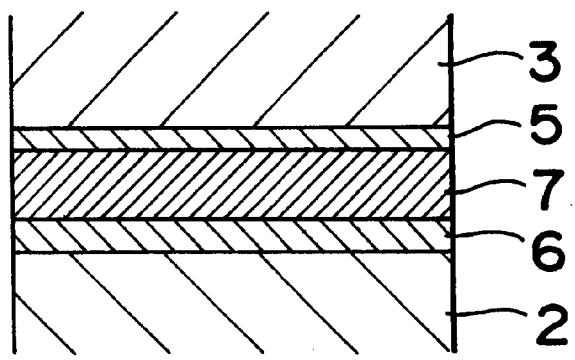
Figure 5B:
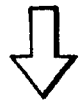
Figure 11:
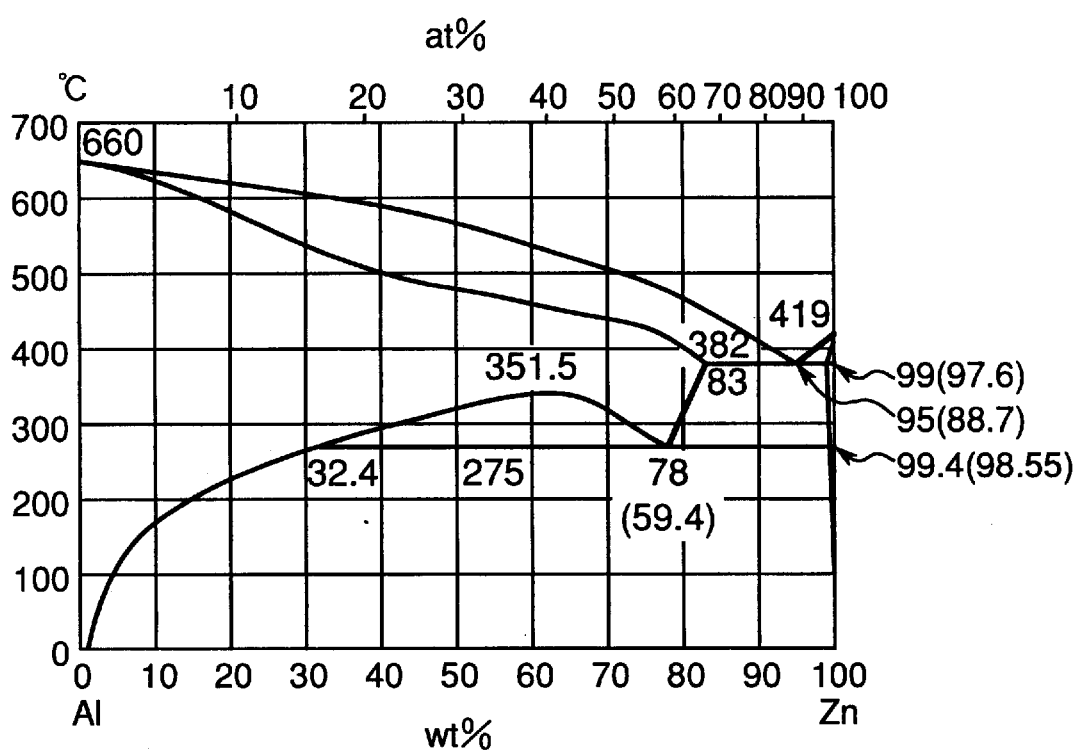
FIG. 11 shows a binary equilibrium diagram of Al—Zn alloy.

The brazing material in a eutectic composition containing about 95% of Zn and about 5% of Al may melt at so low temperature near the eutectic point of approximately 380° C., as shown in FIG. 11, that the brazing material may generally melt easy as soon as the current starts being supplied. The heating of the valve sheet 3 and the opening of the body 2 in contact may soften the joining surface 2a in the cylinder head body 2 to allow the corner or edge between the two joining surfaces 3a, 3b to deform the said joining surface 2a in the cylinder head body 2, and then the valve sheet 3 is embedded into the opening rim in the body 2, as shown in FIG. 4B. Thus, this process ensures that the oxide film effectively is removed from the joining surface 2a of the cylinder head body 2, and that the aluminum side liquid reaction layer 6 containing Zn and Al is formed under the joining surface 2a by the component zinc diffusing from the brazing material into said undersurface, as shown in FIG. 5B. The diffusion reduces the Zn content in the brazing material to increase its melting point to the extent of 500° C., to solidify in part. The rest of non-reacting brazing material, still in the molten state, is squeezed off in the following manner.

Figure 5C:
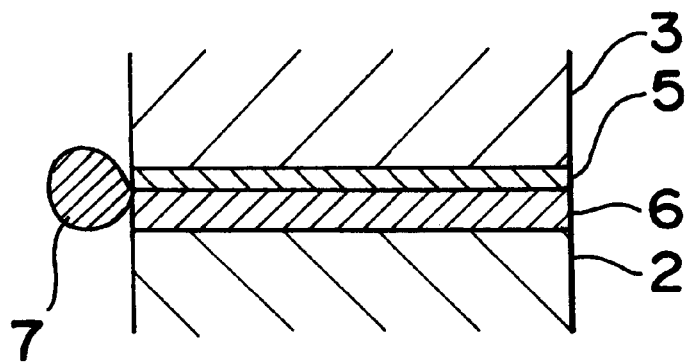

On the other hand, as shown in FIG. 5C, in the process of the joining step, by pressurizing the valve sheet 3 toward the body 2, the brazing material 7 in the molten state can be squeezed from between the two diffusion layers 5 and 6 of the valve sheet 3 and the opening rim the body 2 to the outside, together with oxides and other impurities. Therefor, the iron-side liquid reaction layer 5 and aluminum-side liquid reaction layer 6 are joined directly, without interposing the brazing material 7. In this process, since the diffusion is further promoted between both the liquid layers without brazing material, formation of brittle intermetallic compounds, which would be formed in the presence of the braze material, are prevented so that the joined portion of the resultant joined metal member is very high in joint strength.

In the present invention, the valve sheet and the cylinder head body can liquid diffusion joined with the two liquid reaction layers, so that the input power may be supplied to a minimum extent of melting the brazing material applied in joining. Use of the ultrasonic plating technique enables the thickness of both the brazing layer and the liquid reaction layer on the sheet to be controlled to 1 µm or less, so that the brazing layer is prevented from great deviation in its composition out of the vicinity of the eutectic, which deviation would be due to an increase a content of Fe component in the thin iron-side liquid reaction layer. Such a little heat value in joining effectively restricts deformation of the valve sheet and softening the body, therefor, enhancing the effects of destruction of the oxide films and flow of the brazing material. As a result, the joining strength between the sheet 3 and the body 2 can be increased. The brazing material becomes higher in melting point than 500° C. due to its diffusion toward the body 2 made on basis of aluminum, and then the joined portion of the members can exhibit higher thermal resistance than expected from the melting point of the initial brazing material used.

Furthermore, the copper containing material may be impregnated in the sintered body of the valve sheet, to fill a great number of pores with the high-conductive material, whereby the applied pressure can effectively be used to deform the joined surfaces plastically and squeeze the liquid brazing material off. Also, the brazing material between the joining surfaces are effectively heated to melt by the supplied current, since the heating in the interior part of the sheet 3 is restricted through the thermal and electric conductive copper material filling the pores.

The upper and lower lateral projections 21a, 21b of the supporting body 21 are cantilevers and can flex to the opening side of the supporting body 21, to lower the pressure onto the part of the valve sheet which part is on the opening yoke side, compared with other part in the direction of the supporting body 21, then the excess heat occurs on the said part, on the opening yoke side, of the valve sheet 3 with high contact resistance, resulting in sometimes melting a part of the cylinder head body 2 locally to generate gaps between the valve sheet 3 and the body 2. In order to avoid this, the lower side of the upper electrode 24 may be formed with a notch 28, as mentioned above, which faces to the opening yoke side at a corner of end as shown in FIGS. 7A and 7B. By using such a notch 28, the current across the sheet 3 and the body 2 is decreased in the part facing the opening yoke side so that the local melting of the body and then the gap mentioned above can be prevented. In addition, a insulating component may be attached in the part of the end to obtain the same result, in place of the notch.

In FIG. 4 C, after 1.5–2.5 sec of starting the current supplying, the valve sheet 3 is embedded in the joining surface 2a on the opening rim of the cylinder head body 2 while the pressure remaining and is cooled by stopping the current. The pressure is kept on the valve sheet by pressing until the liquid reaction layer solidifies and cools completely, thereby allowing peeling and cracking the valve sheet due to a difference in thermal expansions between the valve sheet and the body to completely be prevented.

Figure 10:
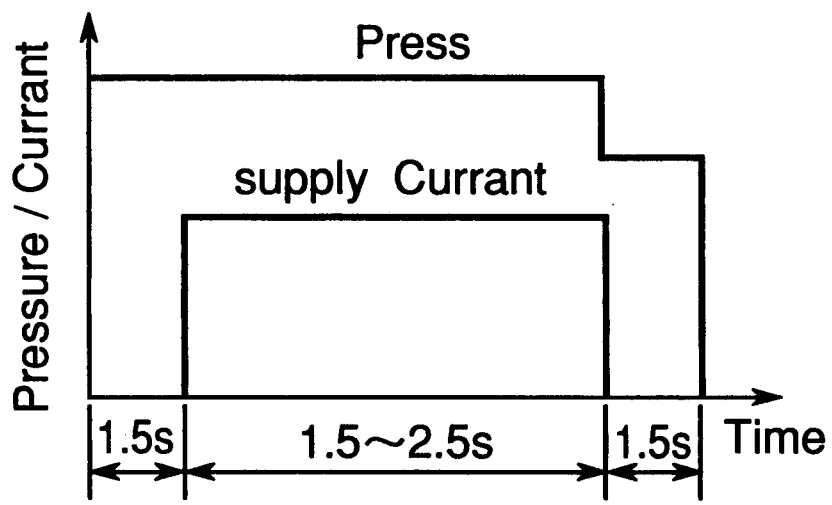
FIG. 10 is a timing cart according to another embodiment, similarly to FIG. 9.

In addition, as shown in FIG. 10, it is preferable to reduce the pressure, and at the same time to stop supplying the power. since great applied pressure is highly possible to bring cracks in the joining surfaces immediately after solidifying in lower deformabilty, the pressure may be decreased to the extent that the joined surfaces can follow their deformation, preventing cracks from taking place.

By Stopping pressing, joining the valve sheet and the opening rim is finished. The same operations are repeated to another three opening rims of the same cylinder head body to join the valve sheets.

Finally, the top and inner surfaces of the valve sheets are machined and finished to desired shapes to form the valve butting surfaces, thus, obtaining the cylinder head.

In this embodiment of the present invention, the cylinder head can be obtained which has higher joining strength and higher resistance to heat than are expected from the brazing materials, since the two members of the cylinder head is joined with the iron-side and aluminum-side liquid reaction layers formed in the surfaces of the members, only by heating and pressurizing the two members for a very short period of time. Also, in the embodiment, the wide range of both the pressure and current in the same time applied may be only adjustable to be controlled for melting the brazing material so as to be squeezed out of the joining surfaces.

Also, this method makes the valve sheet more compact than the traditional method of thermal inserting, so that the throat diameter can be increased with the intervals between the boats 2b, 2b narrowed. The method can improve the thermal conductivity in a range near the valves without forming insulating layer in the joined layer, and allow the cooling medium passages buried between the two boats 2b, 2b to approach the valve sheets, lowering the temperature around the valves. Furthermore, in the case of arranging grow plugs and/or injectors between the boats, this method is possible to ensure the thickness enough between them. Accordingly, this method provides high performance, reliability and freedom of design of the engine.

In the above embodiment, the example of impregnating the copper-containing material in the sintered valve sheet material was shown, but if the density of the sintered body is densified to some extent by the filling of the inductive material, it is not necessary to infiltrate the sintered body completely.

A forged-sintered material of the salve sheet, which may be obtained by forging the material after sintering the powder material, may preferably be selected to flow the brazing material out of the joining surfaces since the pores in the sintered body can be pressed in forging.

The heating method may be selected from the local heating techniques such as induction heating, in place of the electric resistance heating as mentioned above.

In this embodiment, the brazing alloy having a eutectic composition is used, but a composition of its vicinity of the eutectic may be selected. The composition of 92–98% Zn by weight provides a brazing material having a low melting point of 400° C. or less, and effectively preventing deformation of the valve sheet 3 and the softening or partially melting of the aluminum cylinder head body and also ensure joint strength of the produced member.

Embodiment 2

This second embodiment of the present invention is only different from the first embodiment in a method of controlling the currents supplied in joining the valve sheet and the cylinder head body as the metal members from the first embodiment.

Figure 12:
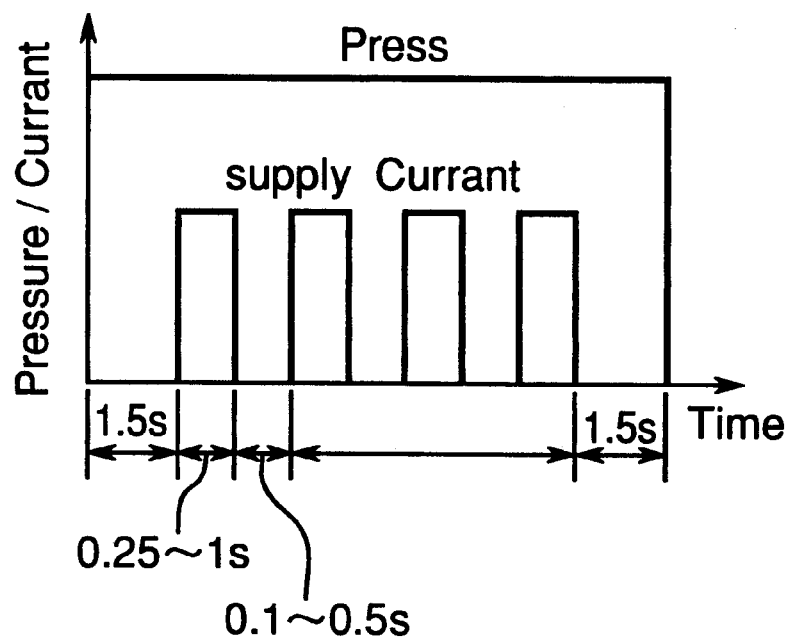
FIG. 12 shows a timing chart according to another embodiment, similarly to FIG. 9.
Figure 13:
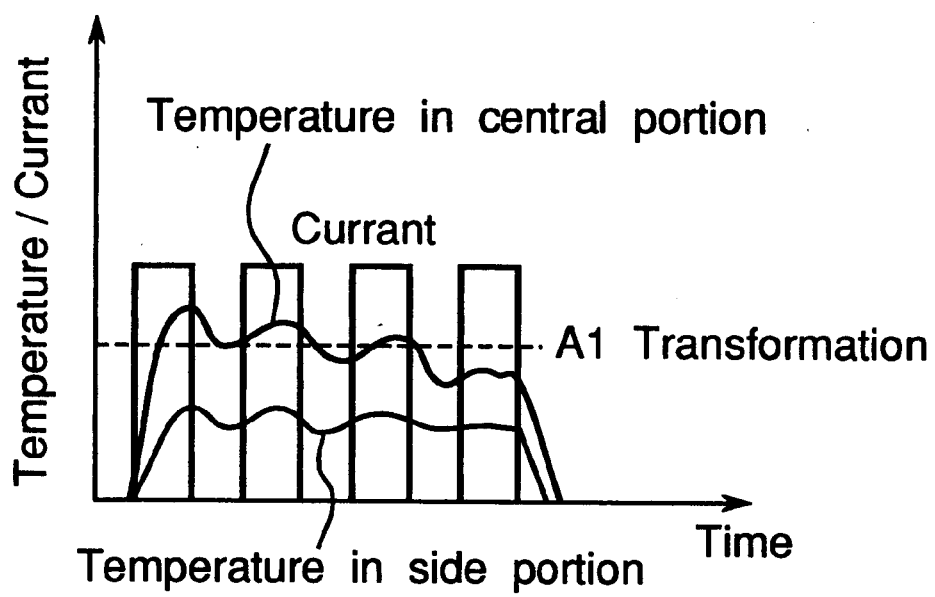
FIG. 13 is a graph showing a temperature change inside the valve sheet in joining by supplying pulse currents according another embodiment of the present invention.

In this embodiment, the pulse current preferably is supplied across the two metal members, which has repeated lower and higher current levels to be supplied by the electric heat controller, not a fixed continuous current. For example, the higher and lower levels are selected to be 70 kA and 0 A, the repeated period passing the higher current is set to 0.25–1.0 sec and that of the lower current is 0.1–0.5 sec. The pulse number of higher current preferably is in a range of 3–9 a batch. For example, FIG. 12 shows 4 pulses a batch, and it takes 1.5 sec from starting pressing to supplying the first higher pulse current, and from stopping the final pulse higher current to stopping pressing. FIG. 13 shows the temperature change at the valve sheet 3 during supplying the pulse current. The temperature of the valve sheet 3 rises rapidly by electric resistance heating across both the surfaces while supplying the current, since the iron-based material has a low heat capacity.

Particularly, the upper or lower central portions of the sheet 3 show lower heat emanation or radiation than the upper and lower edges of the sheet 3 in which the heat emits also large electric resistance heat because of high contact resistance between the valve sheet and the cylinder head body and transfers to the upper electrode and the cylinder head body, so that the temperature of the central portions is to be higher than the Al transformation point of the iron alloy in the sintered materials supplying the first higher current. In this step, since the valve sheet is in a almost completely embedded state in the opening rim of the body, the sheet is cooled promptly from the Al transformation temperature after stopping the current, resulting in quench hardening to increase in hardness in the sheet made of iron alloy material.

Then, as the sheet temperature becomes a little low, the second pulse current begins to be supplied to the sheet and this second pulse current can not increase the temperature so high as the first pulse did, because of the lower resistance between the embedded sheet 3 and the body 2 and low resistive heat by metallurgical bonding of both the members 2 and 3, then, during repeating the pulses, the cooling rate is so lowered that the valve sheet of iron material dose not almost increase in hardness.

Accordingly, in this embodiment 2, such a pulse operation technique causes the temperature at the central portions to reduce gradually by supplying further more pulses, preventing increasing the hardness thereof, and also increasing the machinabilty of the inner peripheral surface to be machined. This method is effective to restrict wear of the valve, which would occur due to over-hardness of the valve butting surface.

Figure 14A:
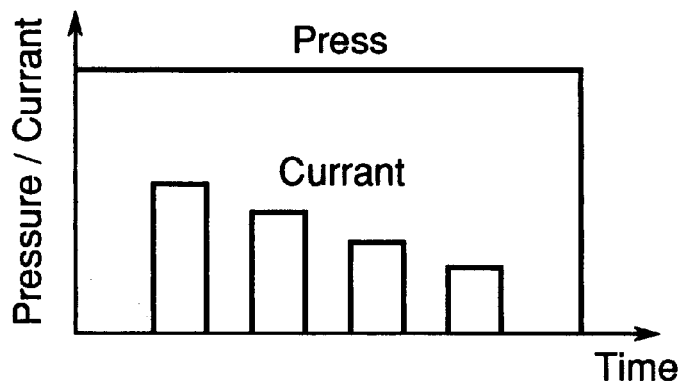
FIGS. 14A–14C show timing charts according to other embodiments, similarly to FIG. 9.
Figure 14B:
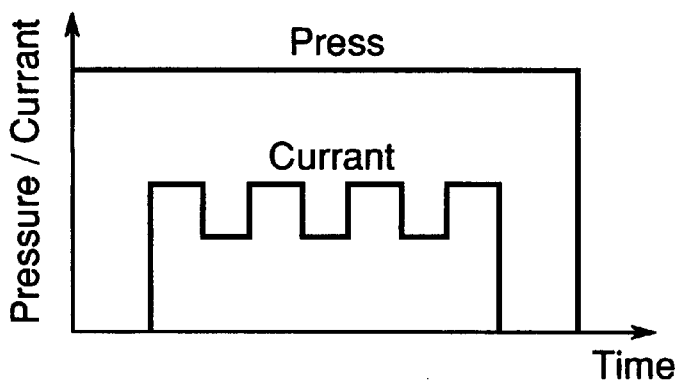

The lower current may be larger than zero, for example within the higher current and zero, while the higher current is constant. The higher current may be phased down in a batch, as shown in FIG. 14A.

Figure 14C:
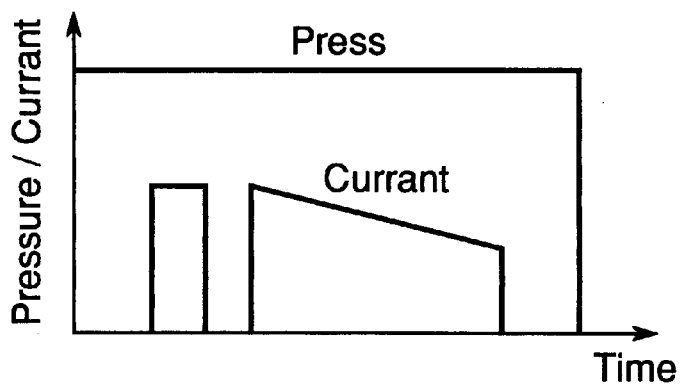

As shown in FIG. 14C, after the initial higher current and the next lower current, the higher current may be switched so as to continuously reduce the current inversely proportional or linear to the period of time. Other measures may be adopted for the current control of cooling slowly the valve sheet.

Figure 15:
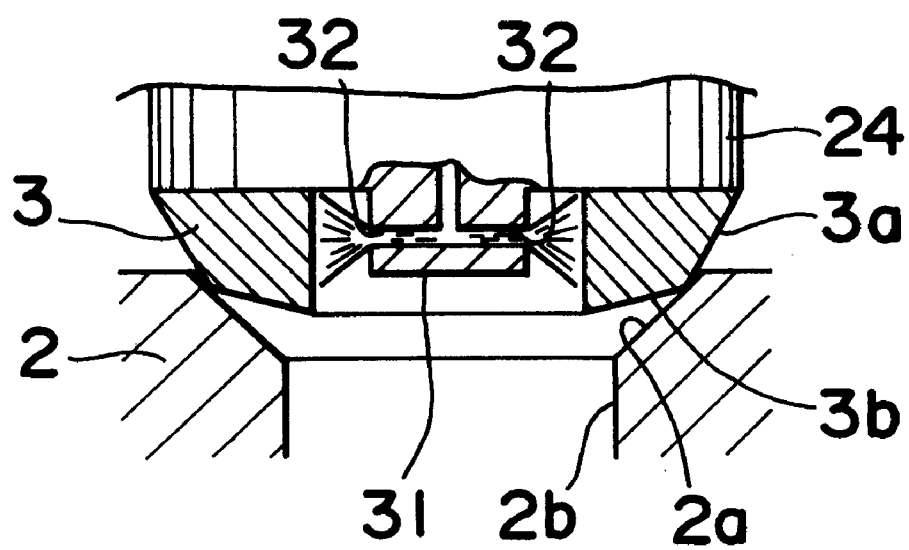
FIG. 15 shows a sectional view of arrangement of a valve sheet and a upper electrode of a joining device, in a end portion of which splay nozzles are arranged to splay water to the inside of the sheet face.
Figure 16:
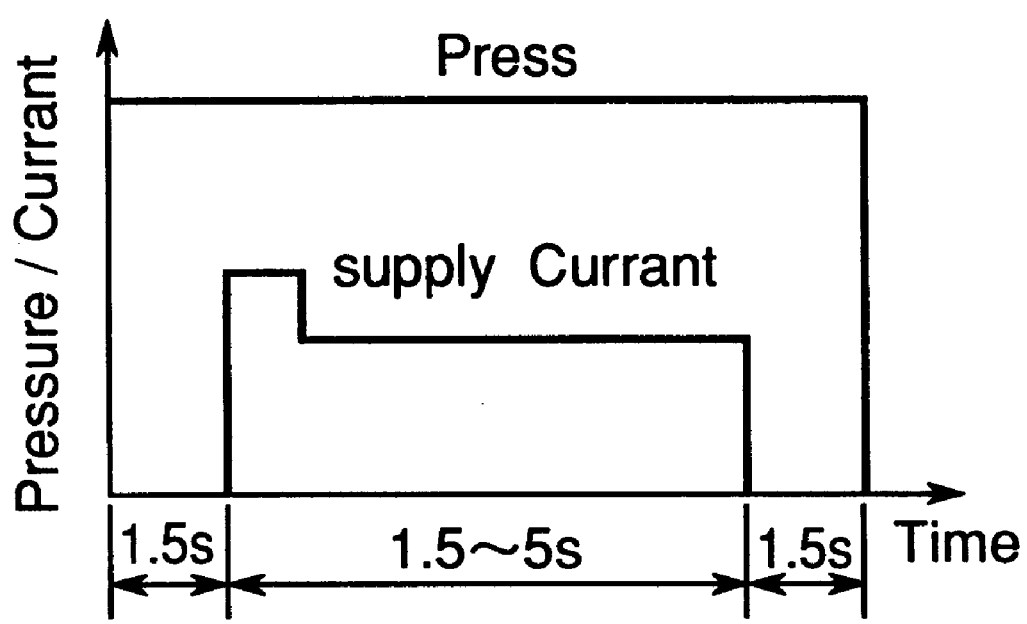
FIG. 16 shows a timing chart according to another embodiment, similarly to FIG. 9.

In order to improve the heat radiation capability of the valve sheet toward the copper electrode, it is desirable to cool the electrode itself with water passed through it. Preferably, a cylindrical projection, which faces to inner peripheral surface of the sheet, may be provided in the lower end of the upper electrode, as shown in FIG. 15, and then the projection is provided with a few number of nozzles 32 which spray the cooling water passed through the electrode toward the valve sheet to be cooled.

This can effectively cool the upper central portion of the sheet on the cylinder head body, thus to avoid over-heating the sheet.

Embodiment 3

This embodiment of the present invention is different from the above embodiments 1 and 2, in a method of controlling the current supplied in joining the valve sheet 3 and the cylinder head body 2.

In this embodiment, a joining device 20 is used to detect a longitudinal position of the valve sheet 3 on the body 2, in which a limit switch, as a height detecting means, is set as to act in the joined position of the sheet where the valve sheet is almost perfectly embedded into the body by pressing and current supplying. As the limit switch act after the initial current was supplied, the current is reduced into a lower level than the initial current, and supply of the reduced current is determined by the current supplied time, which is usually in a range of 1.5–5.0 sec after the supply.

The following is the reason why the current should be switched into the lower values in the state of the sheet embedding. The valve sheet is heated at extremely higher temperature than the cylinder head body which is of aluminum alloy, so that expansion of the sheet 3 becomes increased in spite of its lower expansion coefficient than the aluminum based body 2. If the current is stopped in the state that the sheet 3 is embedded in the body 2, a shrinkage of the sheet thereafter would be greater than that of the cylinder head body 3 during cooling, causing the cracks in the sheet.

In this embodiment, however, since the supplied current is switched into the lower level after the sheet is embedded, the sheet temperature become reduced gradually thereafter, as described in the previous embodiment, and alternatively, the temperature of the body 2 around the sheet 3 rises due to thermal transition from the sheet, then resulting in lowering the temperature difference between the sheet and the body. As the current supply is stopped in this point, the thermal stress produced in the valve sheet can be reduced with a contraction difference between the sheet and the cylinder head body lowered.

Thus, in this embodiment, cracks longitudinal in the inner peripheral portion of the sheet is effectively prevented from generating due to reduction in thermal tension stress residual in the sheet.

Figure 17A:
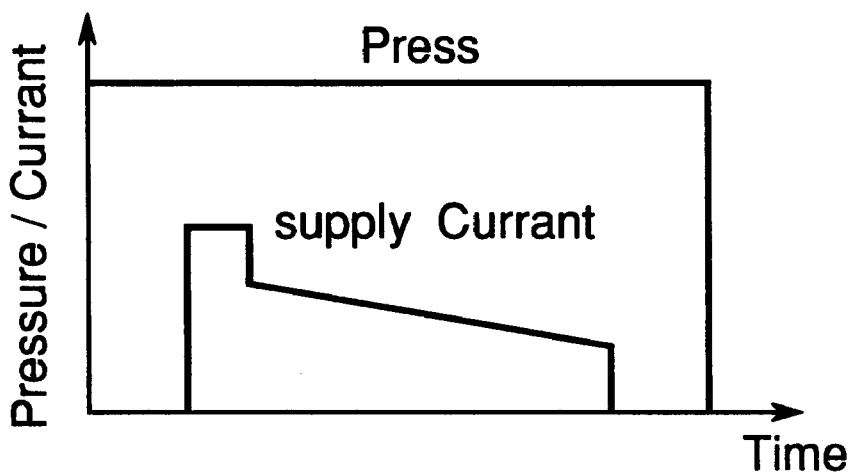
FIGS. 17A and 17B show timing charts according to another embodiment, similarly to FIG. 9.
Figure 17B:
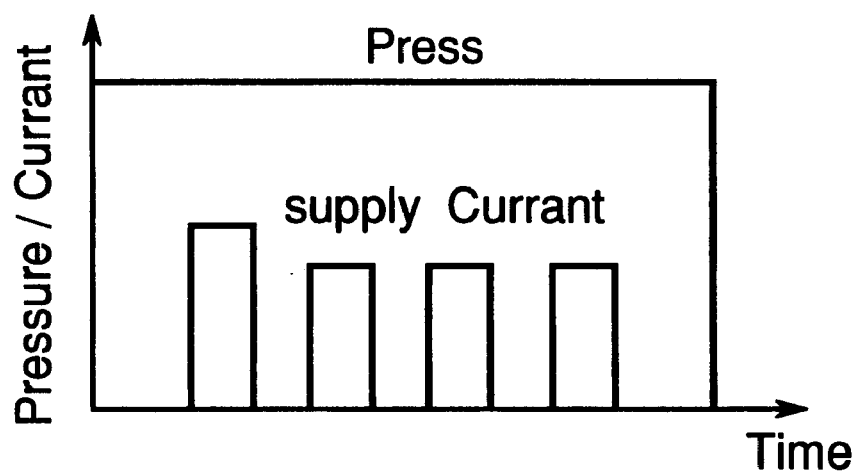

The current after switched by action of the limit switch may be lowered gradually, not fixed, to be inverse relation to the operating time after switching, as shown in FIG. 17A. In addition, the current after switching may be some pulse currents in a lower level than the initial higher current in the same manner that the previous embodiment, as shown in FIG. 17B. The same method of controlling the currents as the previous embodiment can provide the same effects.

In this third embodiment, the height position of the sheet is detected by the limit switch to switch the currents, but a photosensor may be used for the position detecting means. For current control, simply the currents may be determined and controlled using some program according to the passed time after starting to supply the initial great current. In this case, it is preferable to switch the currents to a lower level 0.25–1.0 sec after starting the current supply, particularly 0.25–0.50 sec. within these periods of the supplying time, the switching can be performed in the almost perfectly embedded state of the sheet.

In this embodiment, It is desired to preheat the valve sheet 3 at a temperature up to about 200° C. previously before joining the sheet wit the opening of the body 2. The temperature difference between the sheet and the body can be lowered such that further a stress to be generated in the sheet can be lessened, as a result, preventing cracks in the sheet during a heating process, and omitting the switching the current levels after the limit switch acts.

The joining device mentioned above may be used to preheat the sheet 2. In this case, the upper and lower electrodes may be formed of carbon, in stead of high conductive copper, and then both the ends of the electrodes interpose the sheet and the cylinder head body, which are preheated by supplying the current through the two electrodes. The carbon electrodes emit high quantity of heat so as to effectively heat the valve sheet. This preheating process using the carbon electrodes is possible to correspond to inline production.

Figure 18:
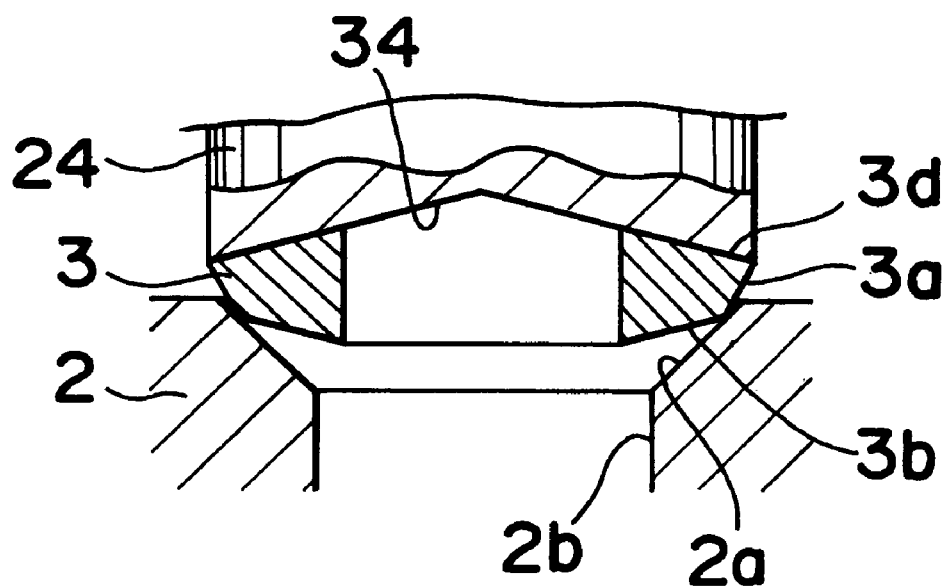
FIG. 18 shows a sectional view of a valve sheet which is also pressed to the direction of decreasing diameter during joining to a specimen by using a pressing electrode according to another embodiment.

As shown in FIG. 18, the valve sheet may be formed with a tapered top surface projected upwards, while the upper electrode is provided with a tapered bottom surface so as to press the sheet with engagement of the electrodes bottom end to the projected surface of the sheet. In this manner, when the electrode presses the sheet, the pressing power is applied to act on the radially outer area in the sheet surface, then preventing the radially outer area from expanding even while the temperature of the valve sheet is rising. Therefor, the shrinkage difference between the sheet 3 and the body 2 is decreased, even if the temperature difference may be large between them, then avoiding the cracks occurring in the sheet.

Figure 19:
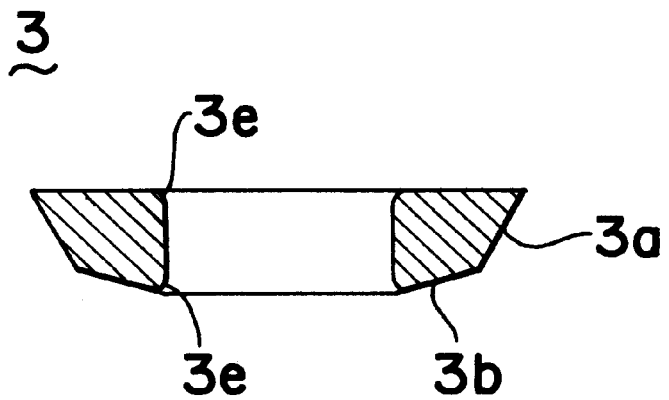
FIG. 19 shows a valve sheet having another configuration according to another embodiment.
Figure 20:
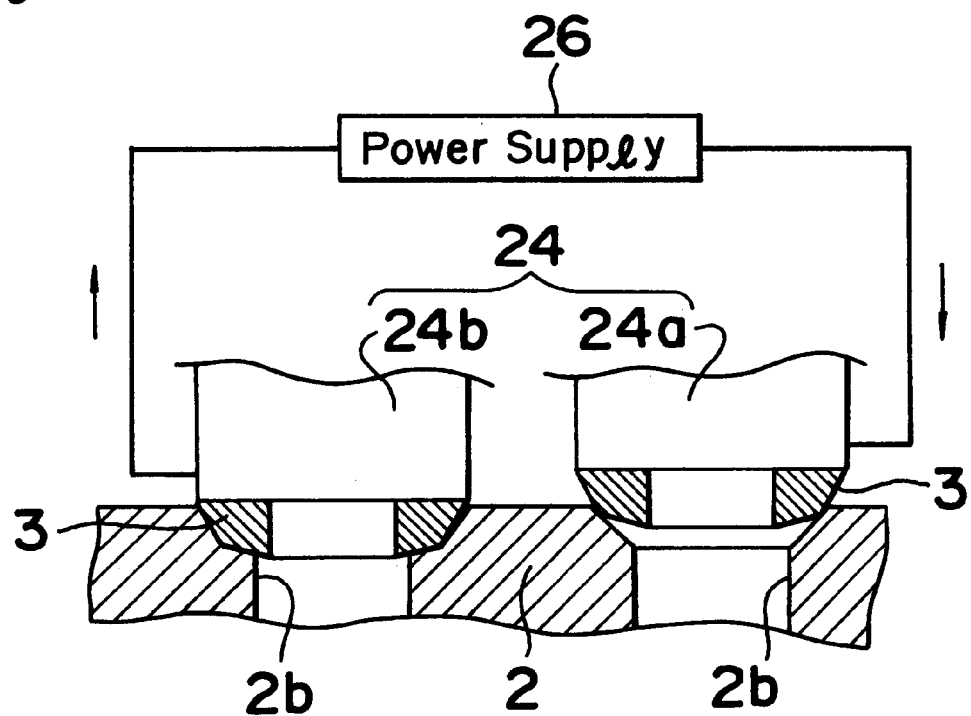
FIG. 20 shows a sectional view of valve sheets and a cylinder head body which are joining by using two electrodes of a joining device according to another embodiment of the present invention.

In order to relax the concentrated stress around the inner periphery in the sheet, it is preferable to form chamfers 3e, 3e on the inner periphery, as shown in FIG. 19.

Since the inner peripheries of the sheet is machined to cut off finally after joining, only the parts to be cut off may be formed by sintering the low-cost material.

Embodiment 4

This embodiment of the invention makes the current passage different from Embodiments 1–3. The joining device 20 contains the lower electrode 25, which is not connected to the welding power supply 26, is used only for accepting the valve sheet 3 and the body 2. The upper electrode 24 comprises two, first and second, electrodes 24a and 24b, wherein the first electrode 24a is the same as the upper electrode as mentioned above and the second electrode 24b is driven by the another press cylinder movable up and down in order to press another valve sheet. The second electrode is of carbon, differently from the first electrode. These two electrodes are connected to the power supply in series through the two sheets 3 and 3 and the body 2.

The first and second electrodes are used to press a new valve sheet 3 to be joined to another boat opening and the previous pressed valve sheet 3 respectively on the cylinder head body 2, while the current supplied to the two electrodes pass around a circuit consisting of the first electrode, the non-joined sheet, the body, the joined sheet, and the second electrode. In this case, the joined sheet is in a current passage to introduce the current to the non-joined sheet.

The first electrode presses the non-joined sheet which is to be heated in high resistive contact with the sheet and the body and joined to the body, as above mentioned. On the other hand, the joined sheet, which has been joined to the body, is pressed again by the second electrode, but the temperature dose not rise plenty, because of low contact resistive heating in the contact joining surfaces.

However, the second electrode of carbon emits much heat by its own Joule heat to heat the valve sheet, this tempering the iron-based valve sheet if it has been quenched and hardened due to the previous pressing. Also, this method can be performed in-line without increasing the operating processes, in order to temper the previous joined sheet quenched on the body. Accordingly, the method according to this embodiment advantageously restricts the thermal affect of joining to hardening the sheet.

In this fourth embodiment, the material of the second electrode was selected from carbon, but another material such as iron, brass, etc. may be selected for the second electrode, to temper the quenched sheet previously pressed by the first electrode, particularly, in case the carbon material shows too high calorific value by Joule heating.

Figure 47A:
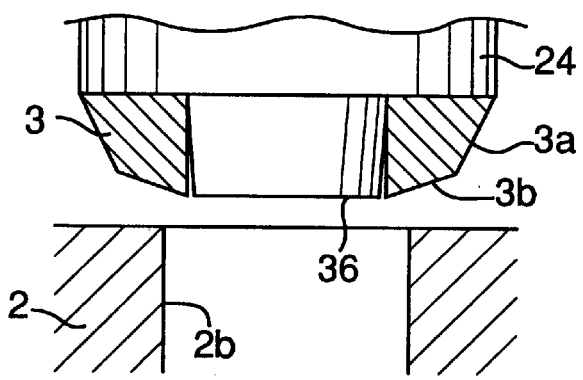
Figure 47B:
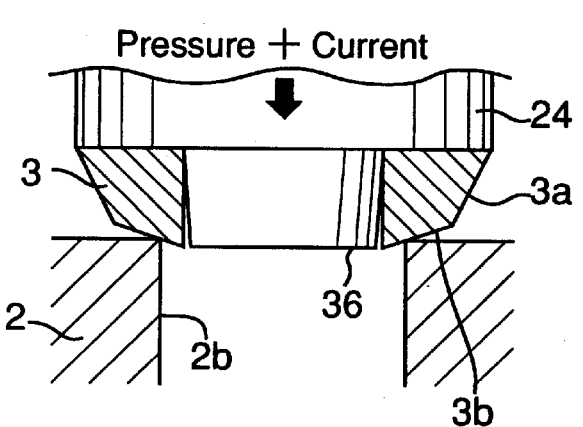
Figure 47C:
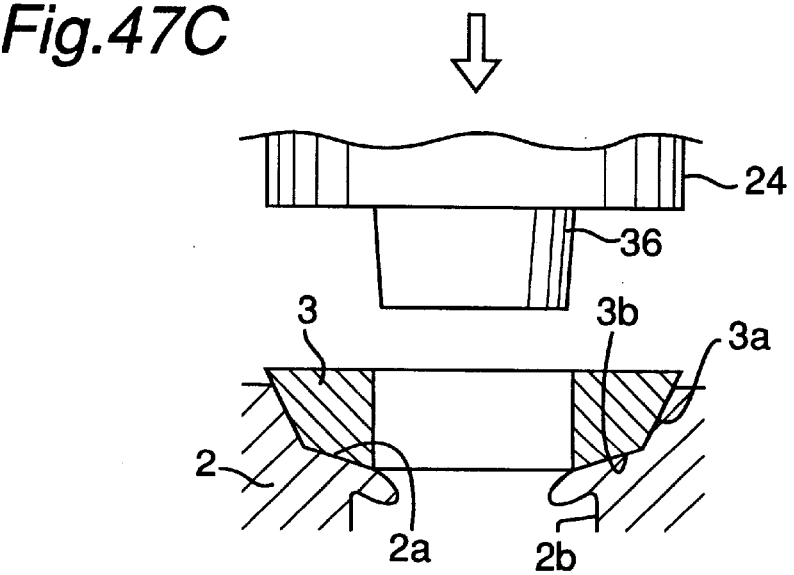

In those embodiments 1–4, the joining surface 2a of the cylinder head body 2 is made in a tapered shape before joining, but the taper may be omitted. Alternatively, the valve sheet may be held to lower end of the upper electrode 24 prior to pressing. In this case, in the end of the upper electrode, the projection part is provided so as to decrease in outer size toward the lower direction as shown in FIG. 47A and then the inner periphery of the valve sheet in a little contracted state is engaged in the outer periphery of the projection. The valve sheet is transferred by the electrode 24 to be set on the cylinder head body and pressed and at the same time heated in the same manner as Embodiments 1–4 to join the two members. The valve sheet 3 becomes embedded into the body which is being deformed by the first and second surfaces of the sheet. Thus, when the joining is finished, a joining surface 2*a* is shaped on the cylinder head body 2 due to the sheet 3 embedded completely in the body. The upper electrode 24 can be easily lifted, and separated from the inside of the sheet. This method is easy to position the valve sheet precisely with respect to the corresponding openings, to be set, of the body 2, and can omit the machining of the cylinder head body, improving the productivity, compared with the above-mentioned method of setting the sheets 3 on the tapered openings of the body 2.

Furthermore, the brazing material may be adopted from a component of the vicinity of the eutectic in above embodiments 1–4.

Embodiment 5

Figure 21:
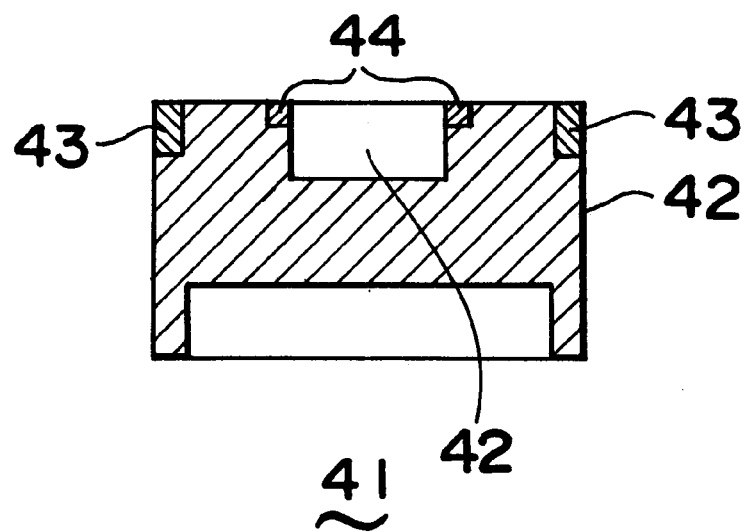
FIG. 21 shows a sectional view of a piston for a engine as a joined metal member.

This embodiment shows a method of joining a wear-resisting ring 43 and a reinforcing member 44 as both first metal members to a piston body 42 as a second metal member 41 to form a Diesel engine as a joined member as shown in FIG. 21. The piston body is of aluminum based material, and the wear-resisting ring is of the iron-based material, as shown above, and fitted for upper periphery of the piston body. The reinforcing member 44 is of a steel such as, for example, austenitic stainless steel, and is joined on the rip portion inside the combustion chamber 42*a* of the top of the piston body 41.

In engine pistons, conventionally, the wear-resisting member has been cast in the piston body to a piston. The cast ring has been heated into Temper T6 to improve the strength as cast, but it is impossible to heat treat the ring under the heating condition of T6 because of brittle Al—Fe based compound formed in the cast.

However, this embodiment of the present invention adopts a method of preheating the piston body 42 to Temper T6, and then joining the wear resisting ring to the piston body. Even if the piston is heat treated at T6 after the ring is joined to said preheated piston body, the piston is high in wear resistance without forming Al—Fe compounds. Therefor, this method can improve the both resistances to wear and high temperature.

On the other hand, this method can adopt the reinforcing member to be attached to the rip portion in the combustion chamber, in order to resolve the problem that cracks tender to take place in the inner corners of the combustion chamber wall on top of the piston.

Embodiment 6

Figure 22:
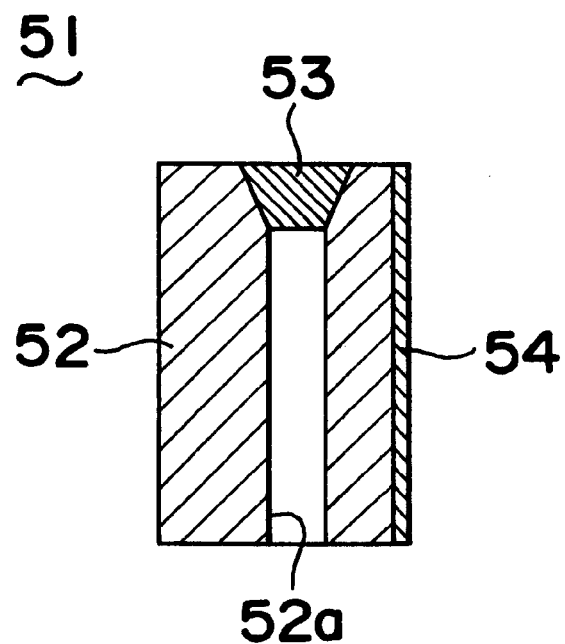
FIG. 22 shows a partial view of a cylinder block as a joined metal member according to another embodiment.

FIG. 22 shows a major part of a cylinder block 51 of a engine as a joined metal member, wherein the cylinder block comprises a cylinder block body made of aluminum based material as a second metal member, and a rib member 54 made of iron based material as a first metal member, which is to be joined on top of the water jacket of said body. In this FIG. 22, a cast iron liner 54 is shown which is engaged in the interior of a cylinder.

Conventionally, in order to improve stiffness of the engine block, rib members have been formed on top of the water jacket using a core in casting the cylinder block body 52, resulting in a problem of extending the production time with poor productivity.

However, the method of this embodiment has advantages of easily casting the cylinder block body 52, joining the rib members 53 on the water jacket 52*a* of said block body 52, then, improving the rigidity of the cylinder block. Therefor, this method can prevent the liners inside the cylinder backers from deforming to improve the engine performances of LOC, NVH, etc., and also is applicable to liner-less engine cylinders.

EXAMPLES

A number of examples according to the present invention were demonstrated, as follows.

Figure 23:
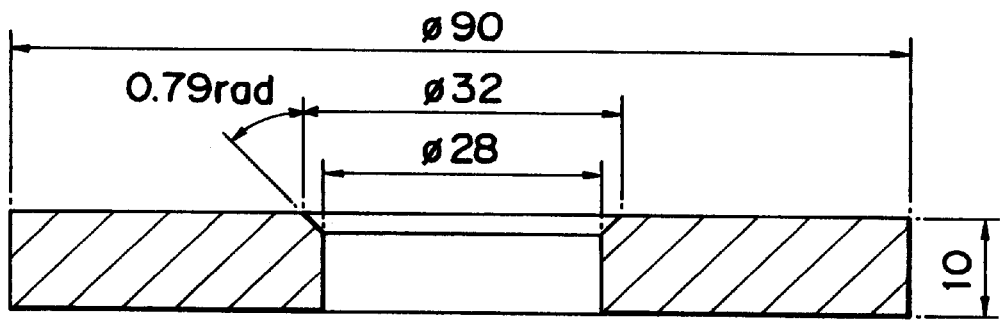
FIG. 23 shows a sectional view of a specimen used in an example.
Figure 24:
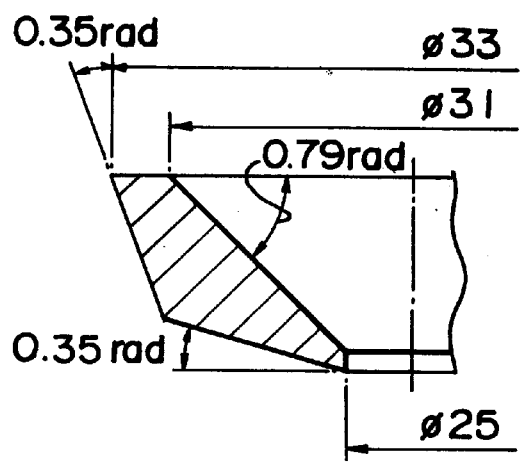
FIG. 24 shows a sectional view of a valve sheet with a thin shape used in an example.

First, as second metal members, specimens were cast of Al casting alloy AC4D as defined in JIS H5202, as shown in FIG. 23, which were heat treated at Temper T6.

Next, five iron-based valve sheets were prepared with their sheet shapes and first joining surface angles $\theta_1$ and braze coating methods varied as shown in Table 1.

TABLE 1

|  | coating method | sheet | $\theta_1$ rad | pressure N | current kA |
|---|---|---|---|---|---|
| Example 1 | friction | thin | 0.35 | 9807 | 44 |
| Example 2 | ultrasonic | thin | 0.35 | 9807 | 44 |
| Example 3 | ultrasonic | thick | 0.35 | 9807 | 50 |
| Example 4 | ultrasonic | thick | 0.52 | 9807 | 50 |
| Example 5 | ultrasonic | thick | 0.52 | 29420 | 60 |
| Comparison | — | thick | 0.52 | 29420 | 70 |

Figure 25:
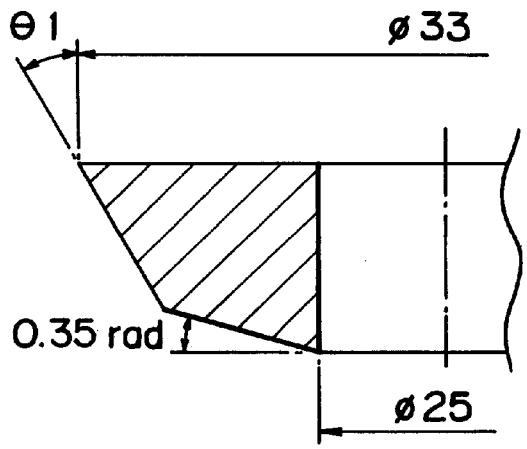
FIG. 25 shows another valve sheet with a thick configuration used in another example.

In Table 1, the terms "friction" means a coating method in which a braze material is rubbed to the sheet surface to form the brazing material and the diffusion layer in a joining surface of the sheet. The terms "ultrasonic" means a method of forming a braze coating using ultrasonic technique in the braze bath as described above. "thin" and "thick" mean having a thin shape near like final product sheets and a thick shape shown in the above embodiments in FIG. 25, respectively.

The materials of the valve sheet were selected from the iron alloy compositions listed in Table 2, in which the amount of each component is indicated by weight, where "TC" is a total content of carbons, including free carbon as graphite and bonded carbon in cementite in the iron alloy.

TABLE 2

| chemical composition (wt %) | | | | | | | | |
|---|---|---|---|---|---|---|---|---|
| C | Ni | Cr | Mo | Cu | W | Co | V | Fe |
| 1.0–1.6 | 1.0–3.0 | 5.5–8.0 | 0.3–0.8 | 11.0–18.0 | 1.5–3.0 | 5.0–8.0 | — | bal |
| 1.3–4.0 | — | 0.4–7.0 | 0.1–0.4 | 10.0–20.0 | 1.2–3.4 | 0.4–1.7 | 0–0.34 | bal |
| 0.5–1.5 | — | 1.0–5.0 | 2.0–6.0 | 10.0–20.0 | 1.0–3.0 | 0.5–2.0 | — | bal |
| 0.5–1.5 | 5.0–10.0 | — | 10.0–15.0 | 7.0–18.0 | — | — | — | bal |

The valve sheets were impregnated with copper into their its bulk and plated with copper film on their surfaces.

The braze material was a eutectic alloy of 95% of Zn, 4.95% of Al and 0.05% of Mg by weight.

The valve sheets of Examples 1–5 were joined to the above specimens 61 in the same manner as Embodiment 1, using the joining device. In a joining process, applied pressure and supplied current to the valve sheet were set as shown in Table 1. the current to each valve sheet was determined such that almost the same prefixed embedding distance should be obtained for all the sheets, though the distances would vary with changes in contact resistances between the sheet and the specimen.

For comparison, a valve sheet, with a thick shape and 0.52 rad (30°) of $\theta_1$ and a copper-plated surface, was joined to the specimen by using a solid diffusion joining which is sown in Table 1 as Comparison.

Figure 26:
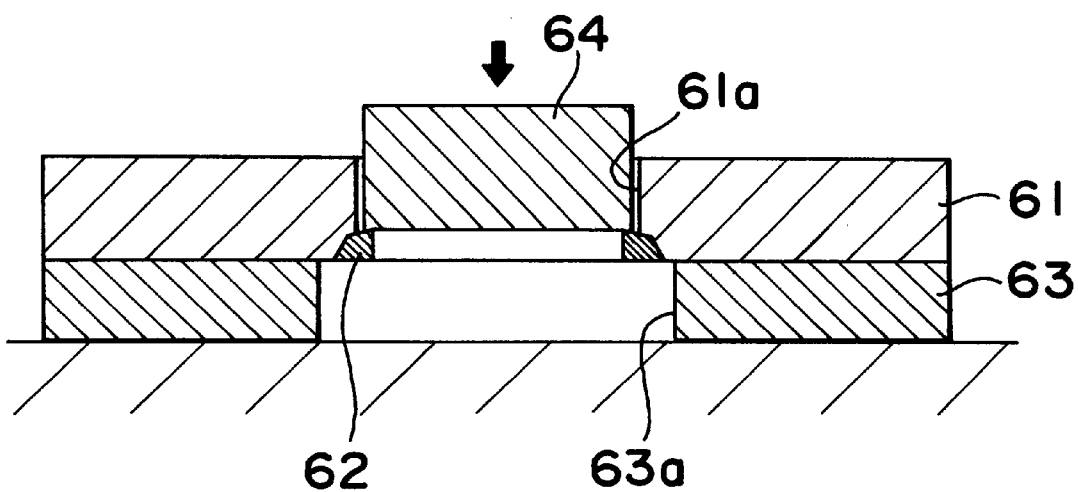
FIG. 26 shows a schematic sectional view of arrangement of a valve sheet on the specimen and a tool butting the sheet used in pull-out test for measuring the joined interface strength.

Joining strength for the valve sheets of Examples and Comparison was determined as a pull-out load of the sheet 62 needed to be pulled off the specimen 61. In this test, as shown in FIG. 26, the specimen 61 was placed on the stage 63 with a through hole 63a to which the sheet 62 joined to the specimen is directed, and the sheet was pushed out of the hole 63a by a pressing tool bar 64 which passed through the hole of specimen and abutted the rear edge of the sheet on the end side.

Figure 27:
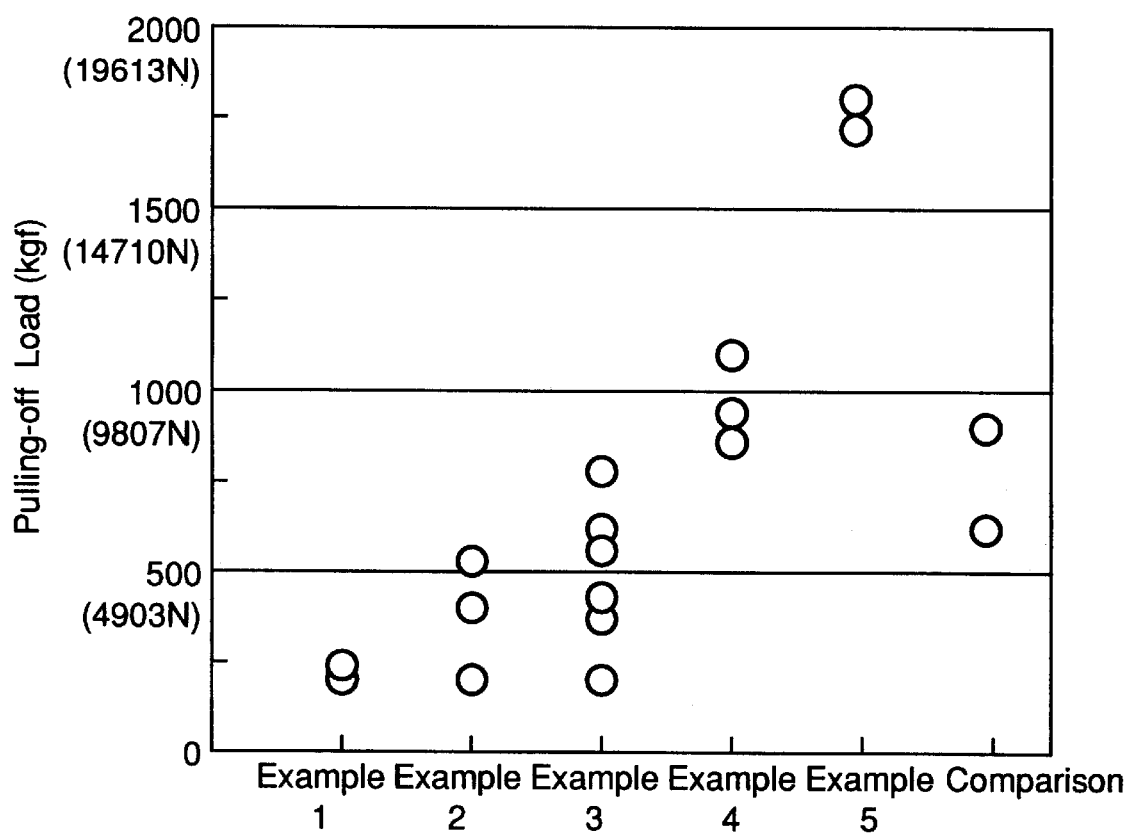
FIG. 27 shows a graph of pull out strength data of the valve sheet joined to a specimen according to another embodiment.

The result of the pull-out load test is shown in FIG. 27. Comparing between Examples 1–2, The sheet which is formed with the brazing layer and iron-side liquid reaction layer in Example 2 by ultrasonic plating is higher in joining strength than what joined by the braze coating by the friction-rubbing method of Example 1. it was found that in Example 2 a iron-side liquid reaction layer was formed in the joined interface after tested (see FIG. 30), but that in Example 1 any traces of brazing and liquid reaction layers was not formed, surely, this causing the lower strength.

Figure 28:
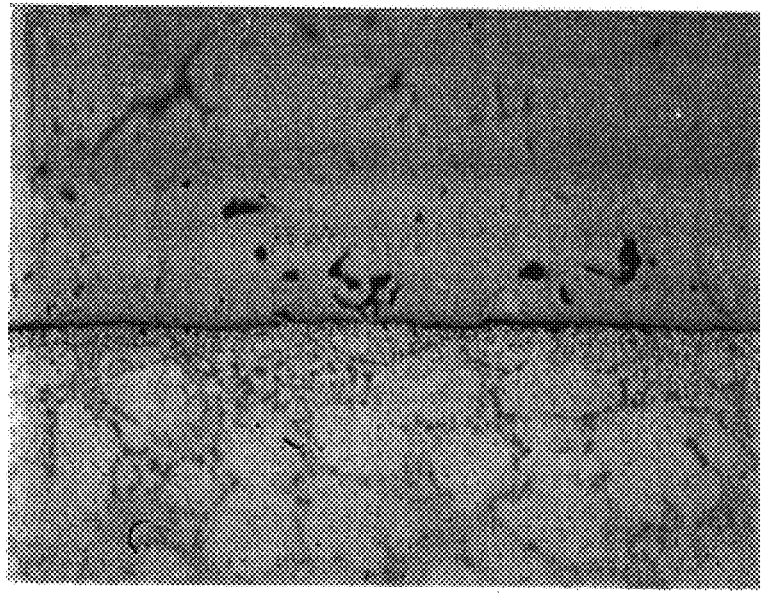
FIG. 28 shows a microphotograph of a surface of the valve sheet as plated using ultrasonic vibration as a example according to another embodiment.
Figure 29:
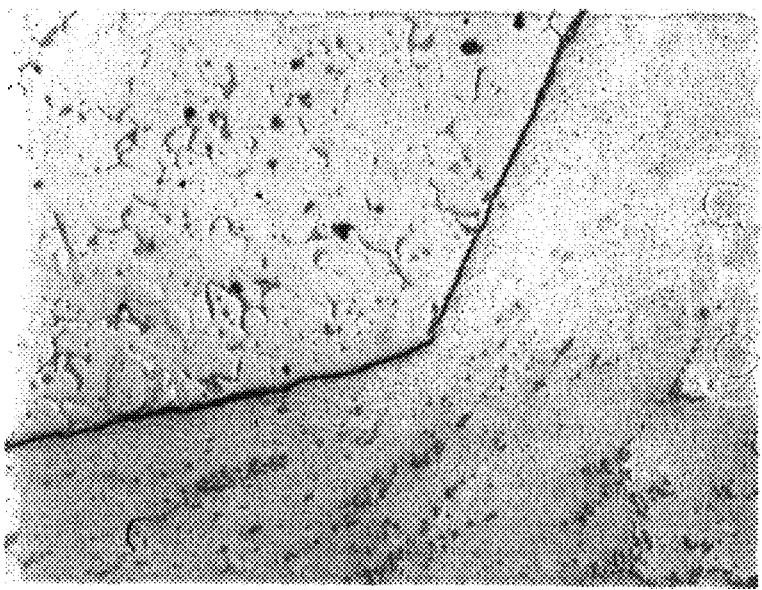
FIG. 29 shows a microphotograph of a joined interface between the valve sheet and the specimen according to a example.
Figure 30:
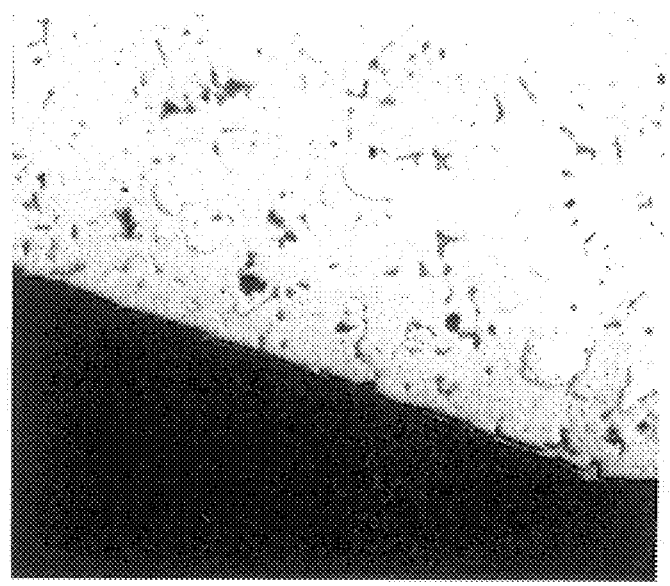
FIG. 30 shows a microphotograph of the joined interface peeled by the pull out test strength.

For Example 2, FIG. 28 shows a microphotographs of the surface of the valve sheet as ultrasonically plated with the braze material, FIG. 29 shows that of the joined interface after joined, and FIG. 30 shows the peeled surfaces after the pull-out test. For the sheet as plated, it is clearly found that under the brazing layer the thin liquid reaction layer is formed on the iron-based material which has copper impregnated in the pores, as shown in FIG. 28 (upper; valve sheet, and lower; thin liquid-side liquid reaction layer with brazing material thereon). In FIG. 29, clearly the two, iron-side and aluminum-side liquid reaction layers are present between the valve sheet and the specimen without any cavities. In FIG. 30, the thin liquid reaction layer is seen remaining left on the surface of the valve sheet.

Comparing between Examples 2 and 3, it is found that the valve sheet having a thick shape is increased in strength than having a thin shape, because an actual pressure which acts to the joining surfaces is decreased by deformation which occurs around each corner of the valve sheet.

Compared with Example 4, the sheet of Example 3, which has a large taper angle $\theta_1$, increases in joining strength because of previous, effective removal of oxide compound layers from the surfaces to be joined.

In Example 5, the sheet is subjected to high pressure in pressing and shows higher pull-out strength, compared with Example 4, particularly, extremely higher strength at the pressure of 3000 kgf.

Figure 31:
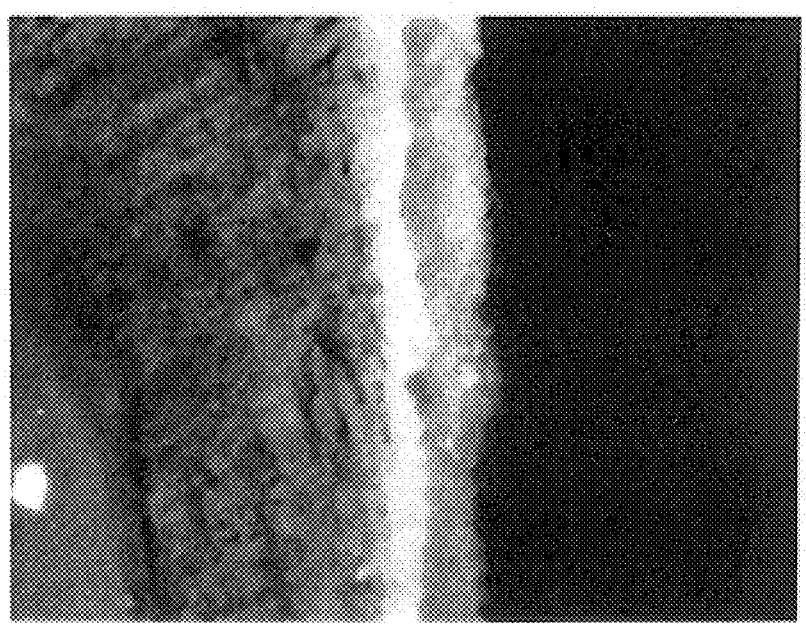
FIG. 31 shows a microphotograph of a joined interface between the valve sheet and the specimen according to another example.

According to electron microscopy of the sheet of Example 5, as shown in FIG. 31, it is found that the iron-side liquid reaction layer and aluminum-side liquid reaction layer (gray region in the microphotograph) with total thickness of about 1 $\mu$m are present between the valve sheet (white region in the microphotograph) and the specimen (the opposite side in the same microphotograph). The presence of Fe, Zn and Al was detected to be in both layers by EPMA.

Further, in order to investigate an affect of the pressure in pressing in detail, the valve sheets were joined to the specimens with the different pressure levels of 9807 N(1000 kgf), 14710 N(1500 kgf) and 29470 N(3000 kgf) in pressing and in other conditions in the same manner as Examples 4–5, to determine the pull-out strength. Hardness was also measured for the above specimens on which the sheets had been joined by applying pressure of 9807N and 14710N. Measurement of hardness was made at points on the specimen in fixed intervals from the corner (which is defined to be zero point in FIG. 33) between the first and second joining surfaces to the outer periphery in a direction inclined at angle 45° on the opposite side to the sheet-joined side of the specimen. The result is shown in FIGS. 32 and 33.

Figure 32:
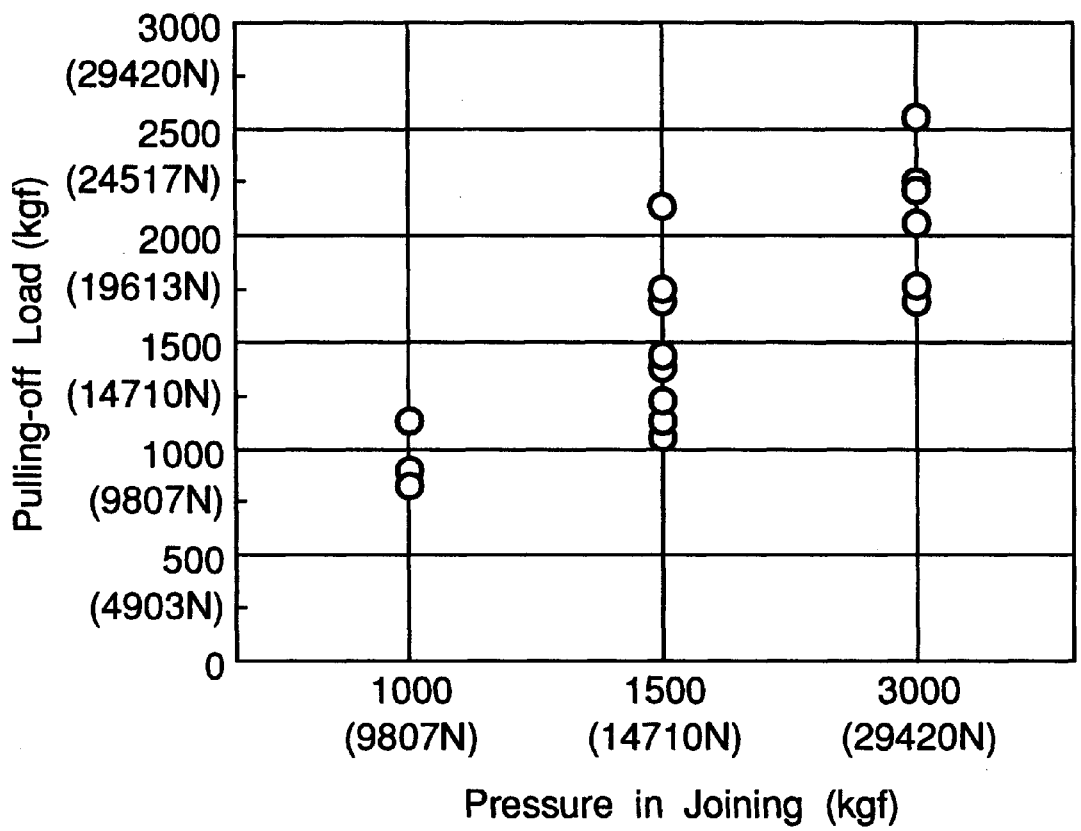
FIG. 32 is a graph showing a relation between the pressure applied to a valve sheet in joining and the resultant pull-out strength of the valve sheet.
Figure 33:
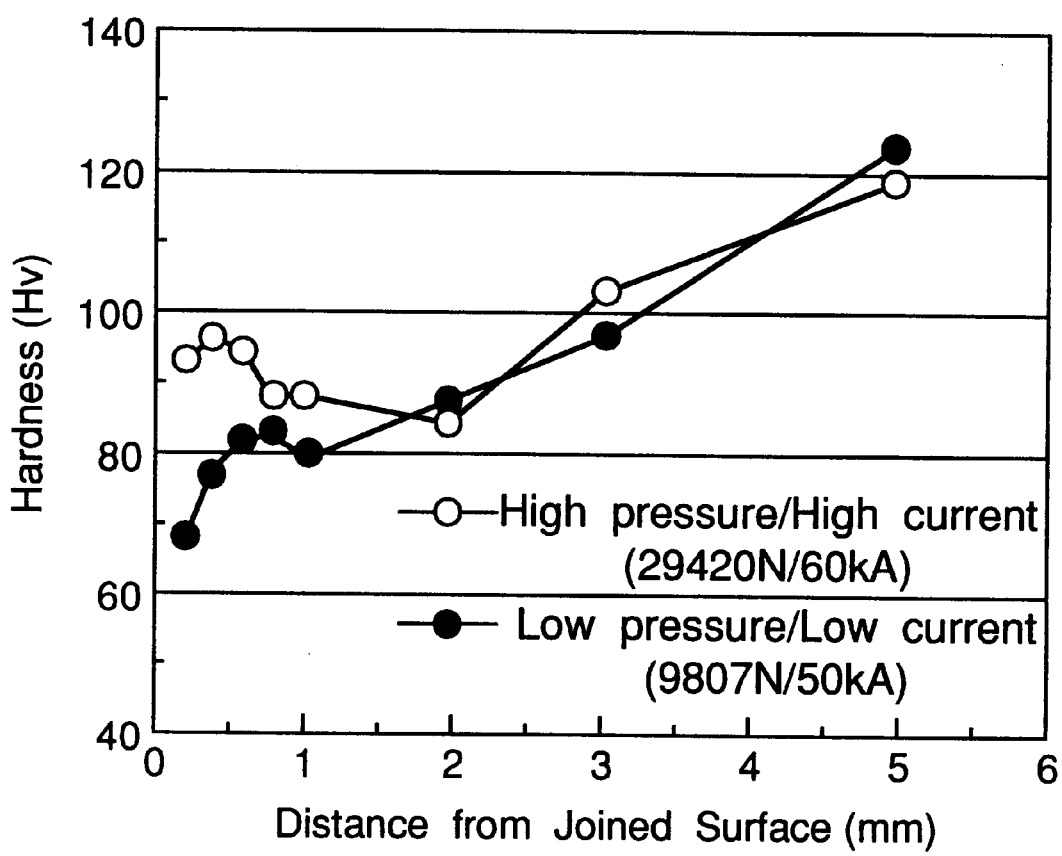
FIG. 33 a graph showing a hardness change depending on a distance from a joined surfaces of the specimen joined in a example.

From FIGS. 32 and 33, it is found that an increase in pressure to the sheet in joining increases the pull-out strength of the specimen, and higher pressure to the sheet increases the hardness of the specimen. In the sheet pressurized at higher pressure, the contact resistance in the joining surfaces is lowered so that the low calorific value of heating can restrict softening the specimen 61 due to low temperature. Restriction of softening the specimen made of the iron based material can ensure that the sheet is easily deformed plastically during pressing to remove the oxide film or other stain components and also in the same time to squeeze the brazing material between the said surfaces from the joined interface.

Furthermore, effect of supply of the pulse currents on the joining properties was investigated. The pulse current to be supplied to the sheet on the specimen was set to a maximum of 70 kA for 0.5 sec and a minimum of 0 kA for 0.1 sec, supplied 7 pulses of the maximum current. For comparison, the continuous current of 60 kA was supplied for 2.0 sec to another sheet to be joined to the specimen. In both cases, the pressure of 2942 N was applied on the sheet.

For the specimens joined with the continuous and pulse currents, hardness was determined in the same manner as the previous Examples. also the sheets were tested to determine hardness at the upper and lower end portions and the central portions of the sheets before and after joined to the specimens.

Figure 34:
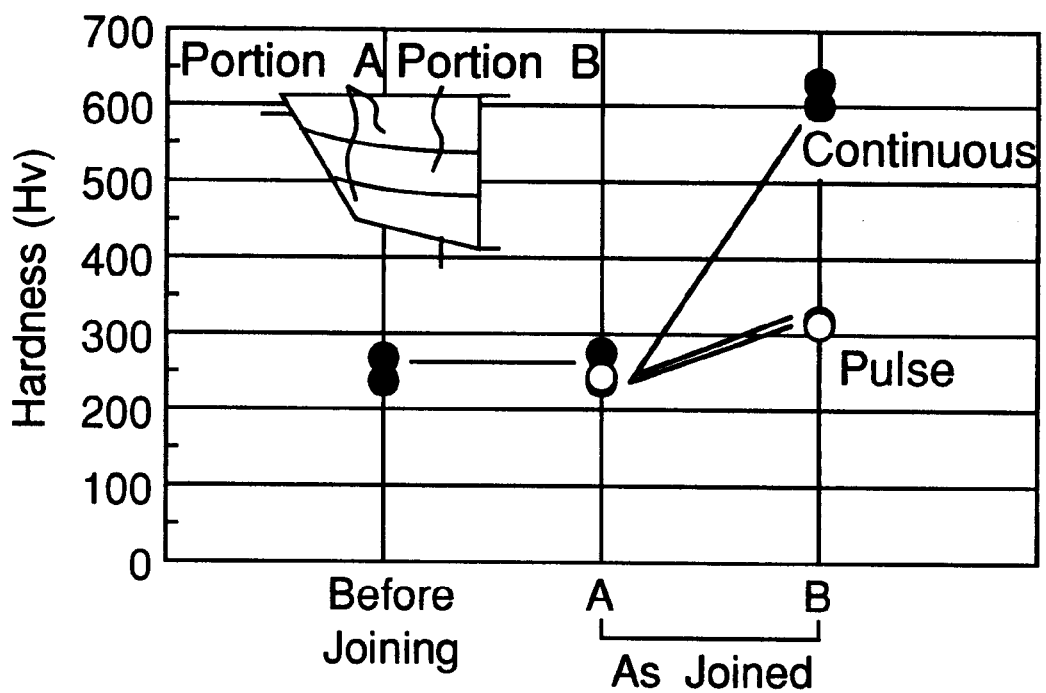
FIG. 34 is a graph showing a change in hardness in the valve sheet before and after joining the valve sheet.

The result of measuring hardness of the sheets, as shown in FIG. 34, shows that in the sheet pressed with the continuous current, the hardness in the central portion is increased after joining by hardening the iron-alloy material of the sheet, but that the hardness on the sheet using the pulse currents almost never increase, due to a slow cooling rate without hardening such a iron alloy material.

Figure 35:
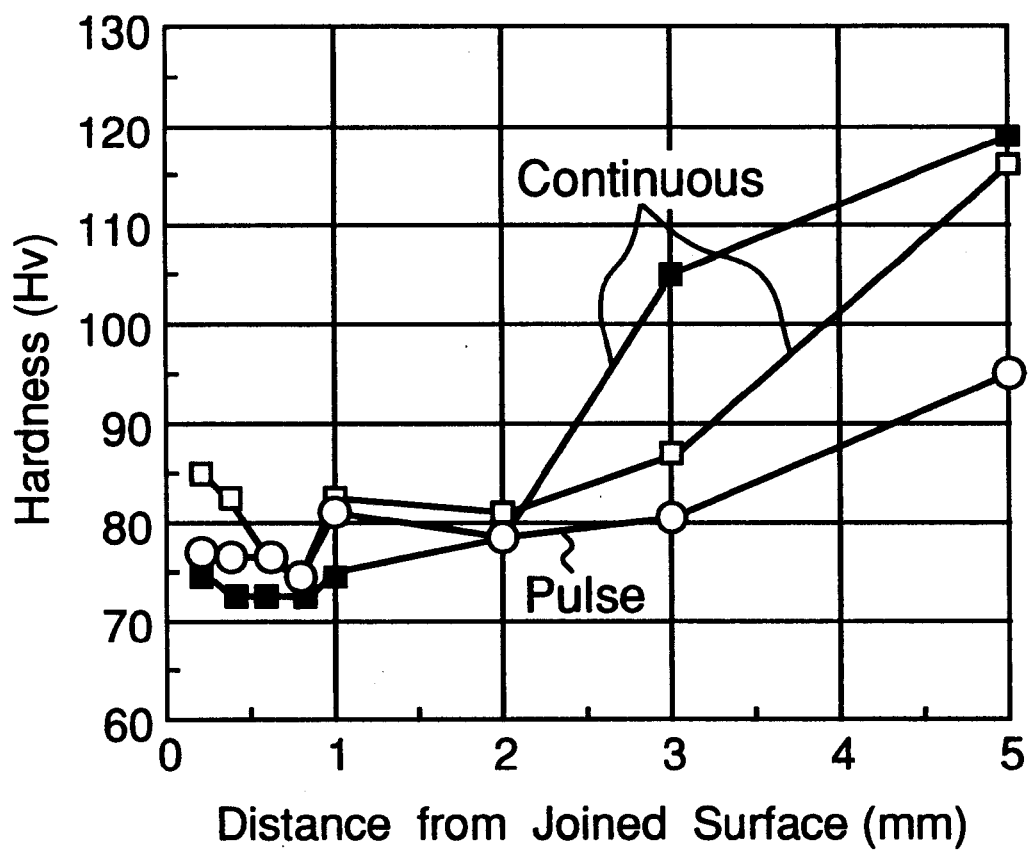
FIG. 35 is a graph showing a change in hardness of a valve sheet depending on a distance from the joined surfaces in a example.
Figure 36:
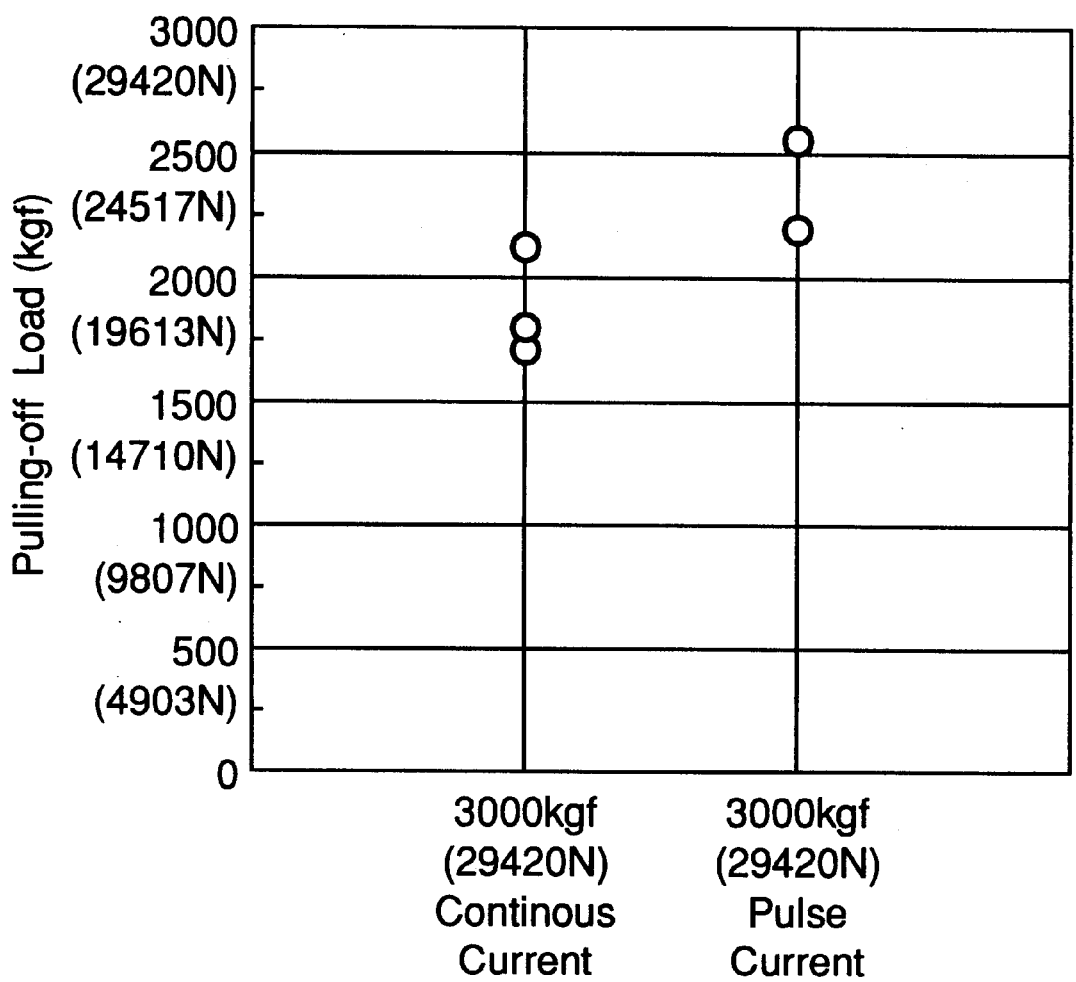
FIG. 36 is a graph showing pull-out strength of valve sheets joined by supplying a continuous current and pulse currents.
Figure 37:
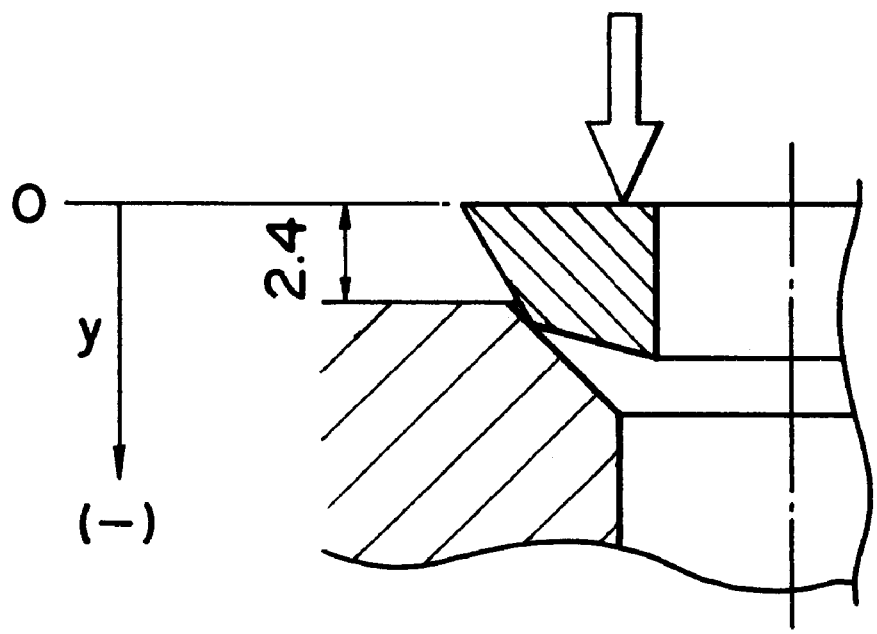
FIG. 37 is a diagram for explaining depths y of valve sheet embedded into the specimen in joining.

The result of determined hardness of the specimen in joining, as shown in FIG. 35, shows that the specimen joined with pulse currents is low in hardness because the specimen is subjected to the heat transition from the sheet. Further, the result of determined joining strength of the joined sheet is shown in FIG. 36.

Accordingly, supply of pulse currents for joining can restrict a hardness increase of the sheet due to slow cooling, and lower the contraction change due to a lower temperature change between the sheet and the specimen to promote the heat transition to the specimen, allowing the joining strength between the two members to increase in a high level.

Next, a time change in embedding depth y during embedding the sheet in the specimen was determined to clarify the behavior of embedding. The test was conducted under the condition of the pulse currents of a maximum of 68 kA and a minimum of 0 kA. Another conditions, the supplying times H and C of the maximum and minimum currents, respectively, the number N of the pulse were made variable in each joining test, under the basic conditions H, C and N predetermined to be H of 0.5 sec, C of 0.1 sec and N of 6 pulses.

Figure 38:
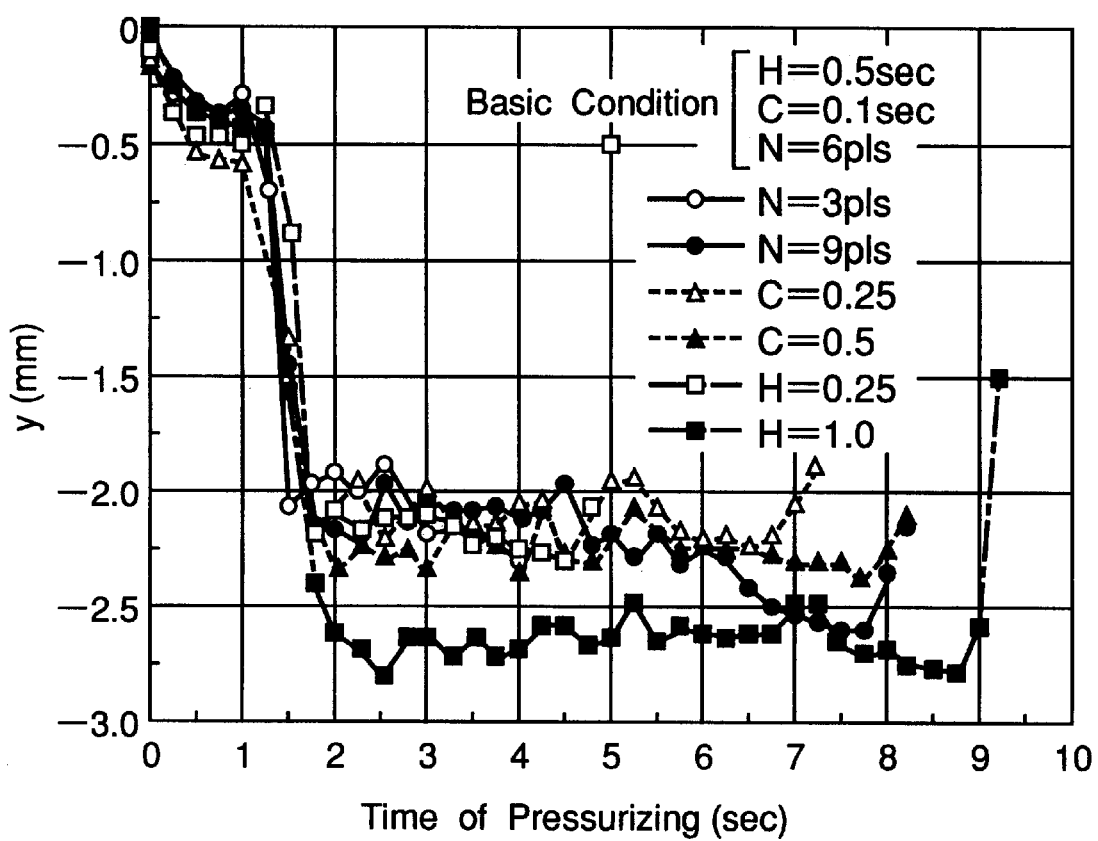
FIG. 38 is a graph showing a relation between depth y and a period time of applying press in joining.

The result of the embedding depth test was shown in FIG. 38. It is clearly found that almost all depth at which the sheet should be completely embedded can have been achieved only by the first pulse of the maximum currents and that the other later pulses almost never progress more embedding. Also, generally, the depth of embedding the sheet dose not vary in these conditions above. However, as the first maximum current pulse is supplied to a sheet longer than 1.0 sec, the sheet has the embedding depth slightly greater than the other sheets for shorter supplying time. In the case of 9 pulses given to the sheet, the further embedding advances in way of supplying pulses. Therefor, it is desirable to set conditions of not only embedding the sheet almost all depth by supplying only the first of all the maximum current pulses but also of allowing the valve sheet to be cooled and the emitted heat to be introduced to the specimen, e.g., a cylinder head body by supplying the second and later pulses of the maximum currents.

A valve sheet consisting of a forged sintered material was joined to the specimen by pressing at a pressure of 29420 N (3000 kg) and supplying pulse currents. The sheet was formed so as to destroy the residual pores by forging the sintered iron-based material described above.

Total 5 pulses of the maximum current of 60 kA for 0.5 sec and minimum 0 kA for 0.2 sec were supplied.

For comparison, a sintered valve sheet with copper impregnated therein was used for joining to the specimen 61 in like manner, while the maximum current was set to be 53 kA. Then, for both the forged sintered and copper impregnated sintered sheets, the hardness was determined at points on the specimen from the corner between the first and second joining surfaces towards the outer periphery in fixed intervals in the direction inclined with an angle of 45° on the opposite side to the sheet-joined side of the specimen.

Figure 39:
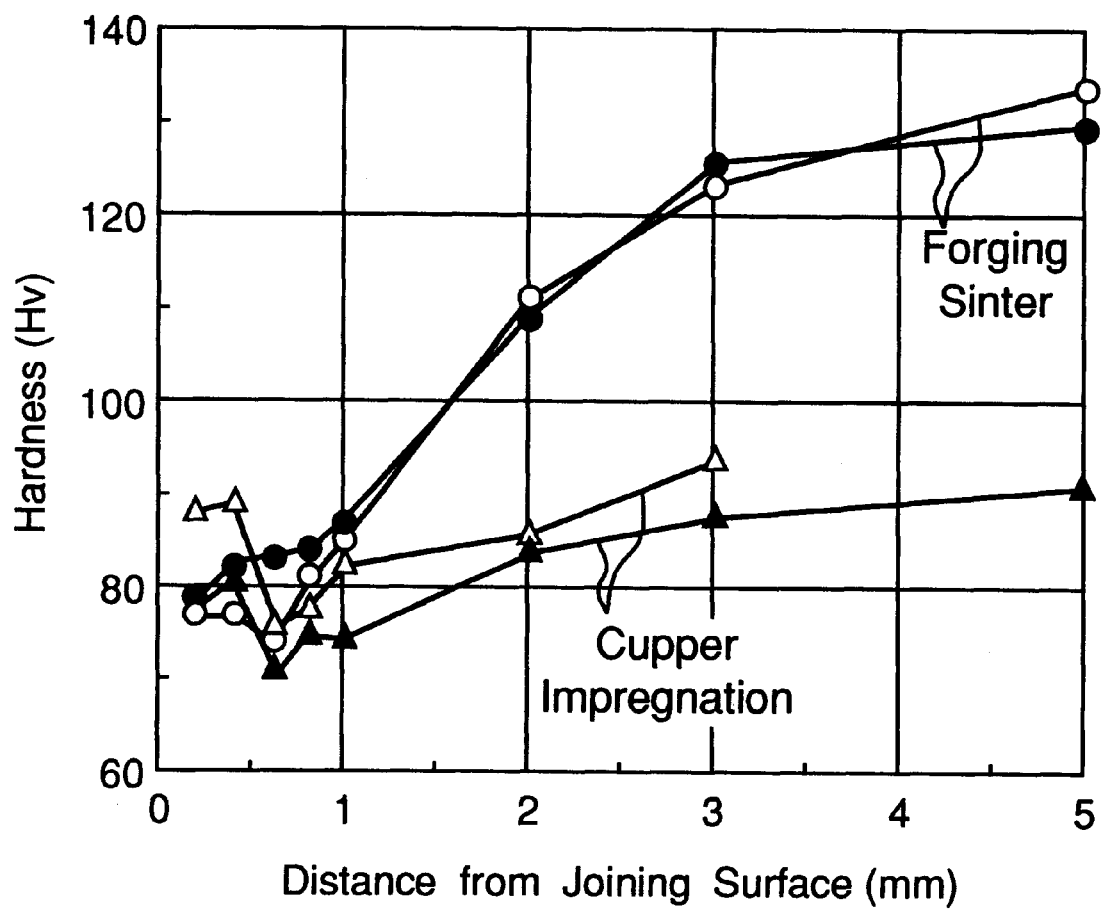
FIG. 39 is a graph showing a change in hardness depending on the distance from a joined interface between a specimen and a valve sheet which is a forged sintered material and a copper impregnated sintered material.
Figure 40:
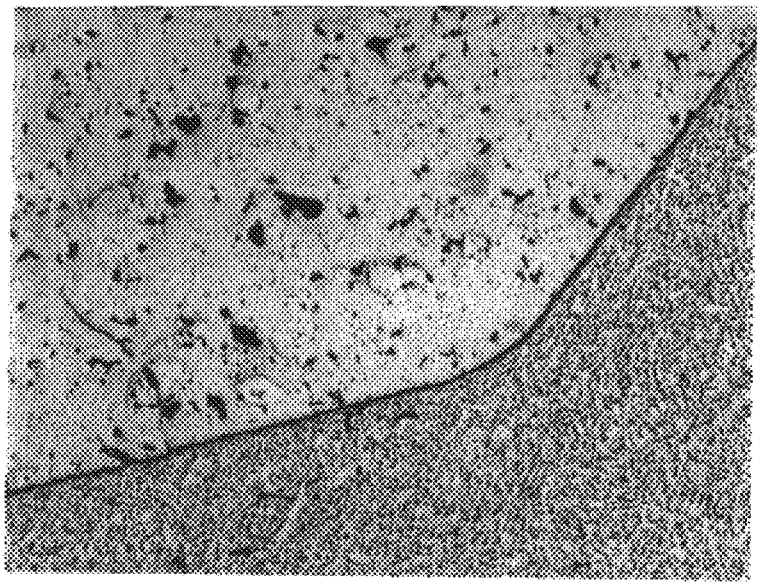
FIG. 40 is a microphotograph (magnification X50) of a joined region of a valve sheet of a forged sintered material and a specimen.
Figure 41:
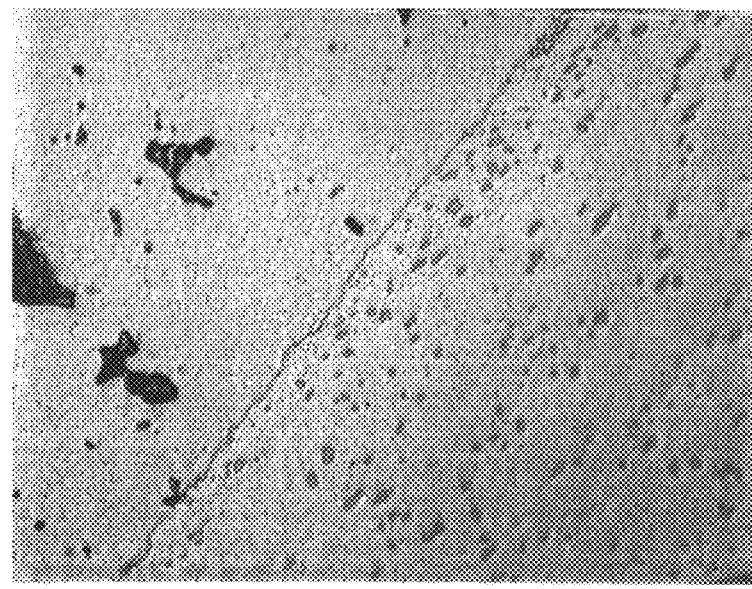
FIG. 41 is a microphotograph enlarged (magnification ×400) of a joined region of a valve sheet of a forged sintered material and a specimen.

The result, as shown in FIG. 39, shows that the specimen with the copper impregnated sheet joined has low hardness, in comparison with that with the forged sintered sheet joined, because the impregnated sheet is softened by much heat which emits in the joining surfaces between the sheet and the specimen due to low resistance in the balk of the sheet. But, the joining of even the forged sintered sheet is achieved well. This is confirmed in microscopy of joined interfaces between the sheet and the specimen as shown in FIG. 40 (photograph magnification; ×30) and FIG. 41 (photograph ×400). By forging the sintered material, the material can pressed so as to destroy the inner residual pores, then showing the same effects as the copper impregnated material.

There was investigated difference between the melt plating and ultrasonic plating techniques to affect on pull-out strength which are adopted to form the brazing layer and the iron-side liquid reaction layer on copper-impregnated valve sheets. The valve sheets 3 plated was joined to the specimens 61 by supplying pulse currents under a pressure of 3000 kgf (29420 N). The supplied currents were controlled to be 3 pulses in a maximum of 70 kA for 0.5 sec a pulse and a minimum of 0 kA for 0.1 sec each.

Figure 42:
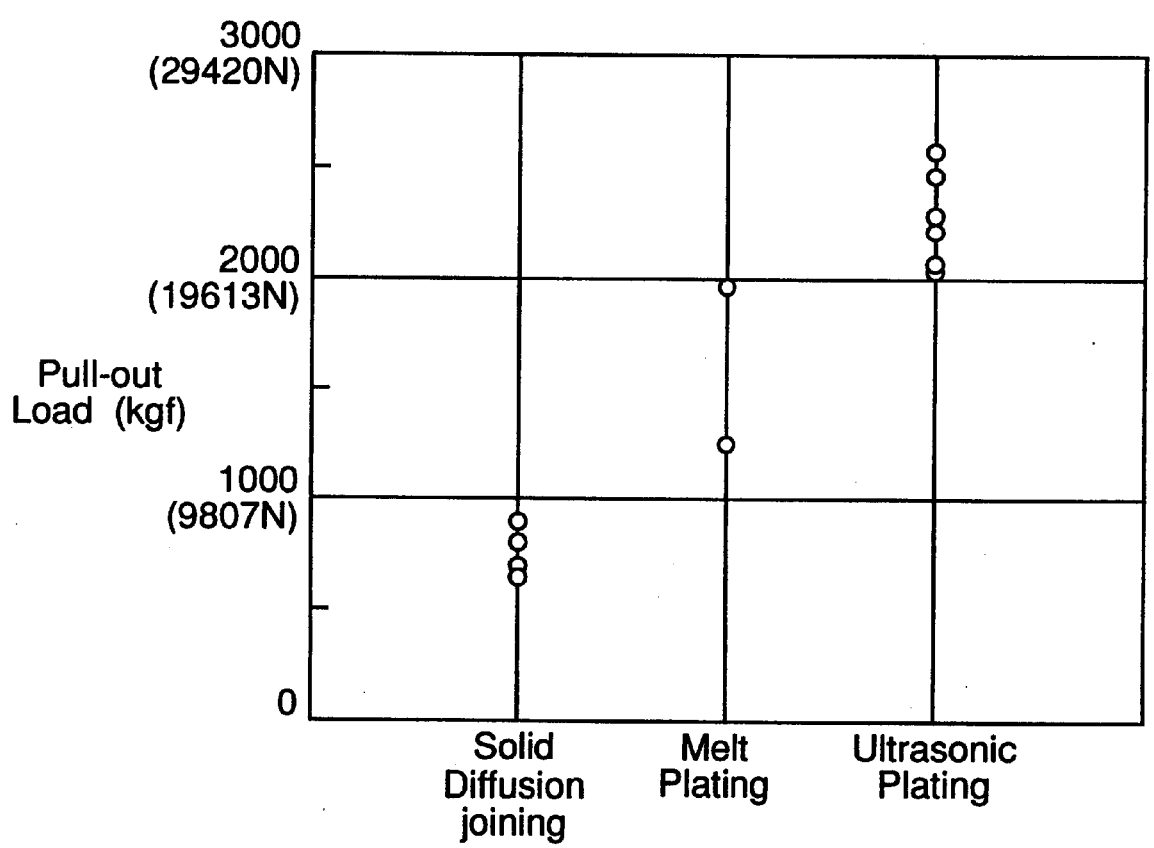
FIG. 42 is a graph showing the pull-off load data of the valve sheet by using a melt plating and ultrasonic plating techniques informing the iron-side diffusion layer and the brazing material on the valve sheet.
Figure 43:
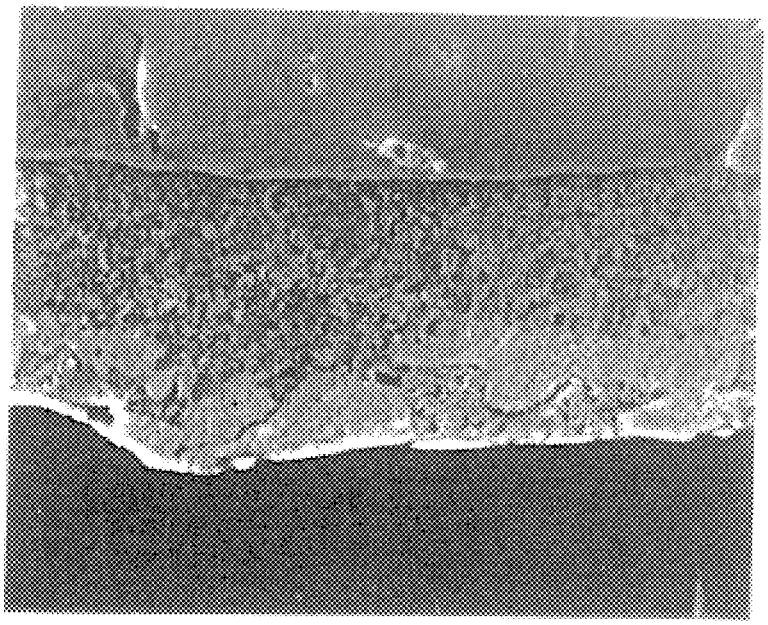
FIG. 43 is a microscopic photograph of the surface of valve sheet, immediately after treated in a simple conventional melt plating technique.

The result of measuring pull-out strength is shown in FIG. 42, in which for reference the pull-out strength of the valve sheet plated by solid diffusion joining also is shown. From this FIG. 42 it is found that the ultrasonic plating can improve the joining strength in the joined interface, compared with the simple melt plating, whereas the simple melt plating is higher in strength than the solid diffusion joining.

Figure 44:
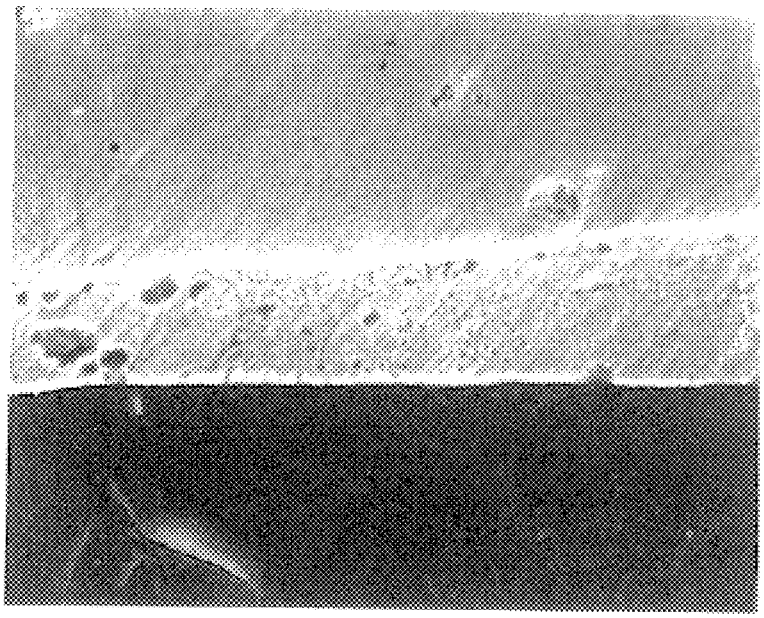
FIG. 44 is a microscopic photograph of the surface of valve sheet, immediately after treated with a supersonic melt plating technique.

The iron-side liquid reaction layer on the valve sheet as plated by ultrasonic plating can have very low thickness of 1.0 μm or less, which is less than the brazing layer, as shown in FIG. 44 in the microphotograph(×1000)(upper side; the valve sheet, thereunder; a brazing layer and iron-side liquid reaction under). On the contrary, the iron-side liquid reaction layer as plated by simple melt plating has almost the same large thickness as the brazing layer as shown in the microphotograph(×1000) in FIG. 45.

Table 3 shows analyzed chemical compositions of the iron-side liquid reaction and brazing layers, as plated, by ultrasonic plating and simple melt plating. The liquid reaction layer ultrasonically plated is too thin to analyze chemically, but it was confirmed that the liquid reaction layer was present between the brazing layer and the material part of the sheet.

TABLE 3

| | chemical composition (%) | | | | | | |
|---|---|---|---|---|---|---|---|
| | Mg | Al | Fe | Si | Cr | Ni | Cu | Zn |
| melt plating | | | | | | | | |
| melt reaction layer | 1.0 | 17.0 | 8.1 | 0.9 | 0.2 | 0.5 | 0.8 | 71.7 |
| brazing layer | — | 0.9 | 0.5 | 0.2 | — | 0.2 | 0.6 | 97.7 |
| supersonic plating | | | | | | | | |
| brazing layer | — | 1.6 | 0.4 | 0.3 | 0.1 | 0.2 | 2.3 | 96.4 |

For the sheet plated by simply melt plating, a thick liquid reaction layer which is formed in joining, is rich in Fe and Al components, lowered in Zn, as shown in Table 3, resulting in great deviation from the eutectic composition. Accordingly, the simple melt plating can maintain the brazing layer in a eutectic composition, but deviates the liquid reaction layer out of the rang of the eutectic composition, then softening the specimen in joining with much input power required to melt the brazing layer, and then being insufficient to remove the oxide films and flow out the brazing material. For this reason, the sheet valve plated by merely melt plating reduces in joining strength, as described above, compared therewith. On the contrary, in the case of use of the Ultrasonic plating technique, the brazing material layer on the sheet can be maintained in the initial composition of a eutectic or its vicinity, and almost all squeezed off effectively in joining, as the thin diffusion layer is left on the joining surfaces, this being increase further joining strength of the sheet to the specimen.

Figure 45:
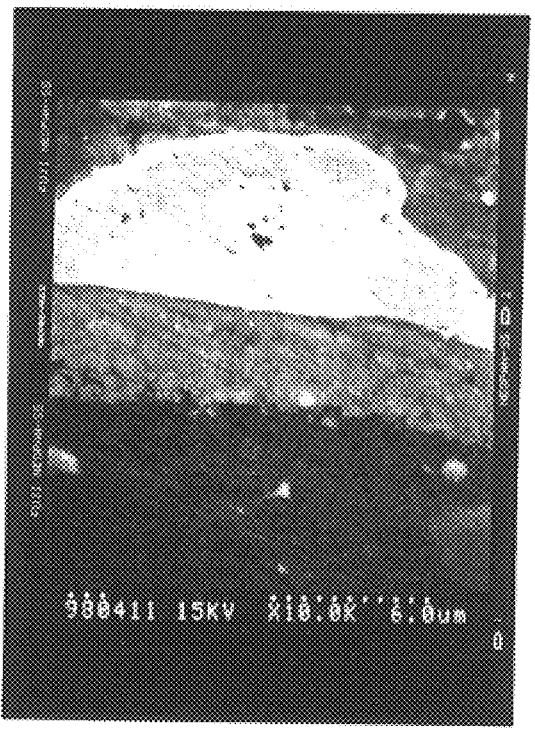
FIG. 45 is a microscopic photograph of the joined interface of the valve sheet and the specimen joined in the case of plating treatment in the simple conventional melt plating technique.
Figure 46:
FIG. 46 is a microscopic photograph of the joined interface of the valve sheet and the specimen in the case of plating treatment with the supersonic melt plating technique; and, FIGS. 47A to 47C are views similar to FIGS. 4A to 4C, showing the configurations of the valve sheet before joining to the cylinder head body, differing from the another embodiments.

Electron microscopic photographs of sections of the joined interfaces between the specimens and the sheets which are merely melt plated and ultrasonic plated are shown FIGS. 45 and 46, respectively, where the photographs represent white part as impregnated copper in the sheet, dark part as a part of the specimen 61, and gray parts between them as iron-side and aluminum-side liquid reaction layers. From these photographs it is clearly found that the ultrasonic plating can reduce sum thickness of the brazing layer plus the iron-side liquid reaction layer, compared with the mere melt plating.

What is claimed is:

1. A method for joining a first and a second metal member to form a joined metal member, comprising the steps of;
   forming a braze layer on a contact surface of the first metal member and a diffusion layer thereunder into said surface by diffusing the brazing material, having a lower melting point than both the members and being easily able to produce a eutectic or the vicinity composition with reaction with the second metal member, on the contact surface of the first metal member; and
   pressing and heating the first and the second metal members between which the brazing material is interposed at a higher temperature than said melting point of the brazing material, to form a diffusion layer on a contact surface of said second metal member, which increases its melting point forcing the second metal member component in the brazing material, and to squeeze the rest of the brazing material out of the contact surfaces of both the metal members, thereby the joined metal member being obtained from the two metal members by liquid diffusion joining of both the diffusion layers with each other which are formed in both surfaces.

2. A method according to claim 1, wherein in the step of pressing and heating, the two metal members are heated with said surfaces facing in contact at said temperature by supplying electric current across both the metal members.

3. A method according to claim 2, wherein in the step of pressing and heating, the current is supplied in pulse currents with higher and lower currents repeated.

4. A method according to claim 2, wherein joining of the first and second metal members which are different in coefficient of thermal expansion, the liquid diffusion is carried out while the first metal member is being pressed on the second metal member with the joining surfaces thereof butted, both the members are heated, by supplying a predetermined period of time and thereafter supplying a lower current for slow cooling than the initial current.

5. A method according to claim 4, wherein in the step of pressing and heating, the predetermined current-supplying period is defined to be a time from start of supplying the current till displacement of the first metal member into a predetermined position to be joined with respect to the second metal member.

6. A method according to claim 4, wherein in the step of pressing and heating, the predetermined current-supplying period is defined to be a constant time from the start of supplying the initial current.

7. A method according to claim 4, wherein in the step of pressing and heating the first metal member on the second metal member, the first metal member is embedded in the second metal member, and the predetermined initial current-supplying period is defined to be a time from start of supplying the current till the embedding of the first metal member into the second metal member at the predetermined position to be joined.

8. A method according to claim 7, wherein in the step of pressing and heating, the initial current is defined as a current to be required for advancing the embedding of the first metal member into the second metal member, and the current for slow cooling is defined as a current to be required for restricting the further embedding of the first metal member into the second metal member.

9. A method according to claim 4, wherein the first metal member is a ring shaped member and the second metal member is shaped with a joining face which encircles the outer periphery of the ring shaped member.

10. A method according to claim 1, wherein the first metal member comprises an iron based material and the second metal members comprises an aluminum based material, and the brazing material is zinc containing material.

11. A method according to claim 10, wherein the brazing material is a Zn—Al based alloy containing Zn in an amount of 92–98% by weight.

12. A method according to claim 11, wherein the Zn-Al based alloy is the eutectic alloy containing Zn of 95% by weight.

13. A method according to claim 1, wherein the first metal member comprises a sintered material.

14. A method according to claim 13, wherein the sintered material is forged.

15. A method according to claim 13, wherein the sintered material is impregnated with a high electric conductive material prior to the step of pressing and heating.

16. A method according to claim 15, wherein the high electric conductive material is a copper based material.

17. A method according to claim 1, wherein in the step of forming a brazing material and the diffusion layer, the brazing material and the diffusion layer of the first metal member is formed at a total thickness of 1 $\mu$m or less.

18. A method according to claim 17, wherein in the step of forming a brazing material and a diffusion layer, the first metal member is soaked in a bath of the brazing material applying ultrasonic vibration to form the brazing material thereon and the diffusion layer.

19. A method according to claim 1, wherein in the step of pressing and heating, in liquid diffusion joining the two members, the second metal member is plastically deformed by pressing the first metal member thereto, thereby.

20. A method for joining a first metal member of iron based material and a second metal member of aluminum based material, comprising steps of;

forming a braze layer on a contact surface of the first metal member through a diffusion layer thereunder by diffusing into the contact surface a brazing material comprising a Zn—Al based eutectic alloy containing Zn of 95% by weight; and, pressing the first and the second metal members between which the brazing material is interposed and heating by supplying current across a metal members at a higher temperature than said melting point of the brazing material, to form a diffusion layer on a contact surface of the second metal member with the brazing material which increases in its melting point due to concentration of the Al component from the second metal member component, and then to squeeze the remaining brazing material out of the contact surfaces of both the metal members, thereby the joined metal member being obtained from the two metal members by liquid diffusion joining of both the diffusion layers with each other which are formed in both of the surfaces.

* * * * *

UNITED STATES PATENT AND TRADEMARK OFFICE
CERTIFICATE OF CORRECTION

PATENT NO. : 6,222,150 B1
DATED : April 24, 2001
INVENTOR(S) : Seiji Nomura et al.

It is certified that error appears in the above-identified patent and that said Letters Patent is hereby corrected as shown below:

<u>Title page,</u>
Add the following Foreign Application Priority Data,
-- [30]  Foreign Application Priority Data
   August 20, 1998   (JP)…………………………...10-252046 --

Signed and Sealed this

Eleventh Day of June, 2002

*Attest:*

JAMES E. ROGAN
*Director of the United States Patent and Trademark Office*

*Attesting Officer*